(12) United States Patent
Oya et al.

(10) Patent No.: US 11,066,998 B2
(45) Date of Patent: Jul. 20, 2021

(54) COMPRESSOR ROTOR, COMPRESSOR AND GAS TURBINE

(71) Applicant: MITSUBISHI HEAVY INDUSTRIES, LTD., Tokyo (JP)

(72) Inventors: Yoshiko Oya, Tokyo (JP); Yoshiyuki Okabe, Tokyo (JP); Masato Araki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 406 days.

(21) Appl. No.: 16/084,789

(22) PCT Filed: Mar. 30, 2017

(86) PCT No.: PCT/JP2017/013168
§ 371 (c)(1),
(2) Date: Sep. 13, 2018

(87) PCT Pub. No.: WO2017/170829
PCT Pub. Date: Oct. 5, 2017

(65) Prior Publication Data
US 2019/0072037 A1   Mar. 7, 2019

(30) Foreign Application Priority Data
Mar. 30, 2016   (JP) .............................. JP2016-068191

(51) Int. Cl.
*F02C 7/18*    (2006.01)
*F04D 19/02*   (2006.01)
(Continued)

(52) U.S. Cl.
CPC .............. *F02C 7/18* (2013.01); *F04D 19/02* (2013.01); *F04D 29/32* (2013.01); *F04D 29/321* (2013.01); *F04D 29/58* (2013.01); *F05D 2240/24* (2013.01)

(58) Field of Classification Search
CPC ........................................................ F01D 5/087
See application file for complete search history.

(56) References Cited

U.S. PATENT DOCUMENTS 7,159,402 B2 * 1/2007 Hein ...................... F01D 5/081
  415/115
8,250,870 B2 * 8/2012 Hein ...................... F01D 17/105
  60/785
(Continued)

FOREIGN PATENT DOCUMENTS

| JP | 01-125526 | 5/1989 |
| JP | 2011-208640 | 10/2011 |
| JP | 2016-205308 | 12/2016 |

OTHER PUBLICATIONS

International Search Report dated Jun. 20, 2017 in International (PCT) Application No. PCT/JP2017/013168.
(Continued)

*Primary Examiner* — Kayla Mccaffrey
(74) *Attorney, Agent, or Firm* — Wenderoth, Lind & Ponack, L.L.P.

(57) ABSTRACT

A compressor rotor includes a first outer cavity formed in a rotor main body and into which air on a high-pressure side of blades is to be introduced, a first inner cavity formed in the rotor main body on an inner side in a radial direction of the first outer cavity; and a first communication passage which connects the first outer cavity and the first inner cavity to each other in the radial direction of the first outer cavity. Along an entire length of the first communication passage from the first outer cavity to the first inner cavity, the first communication passage is inclined toward a forward side of a rotation direction of the rotor main body.

13 Claims, 19 Drawing Sheets

(51) Int. Cl.
    *F04D 29/58*        (2006.01)
    *F04D 29/32*        (2006.01)

(56) References Cited

U.S. PATENT DOCUMENTS

| | | | |
|---|---|---|---|
| 9,085,983 B2 * | 7/2015 | Are | F01D 5/082 |
| 10,787,908 B2 * | 9/2020 | Hwang | F01D 5/082 |
| 2011/0236190 A1 | 9/2011 | Chiu et al. | |
| 2018/0051710 A1 | 2/2018 | Takamura et al. | |
| 2018/0298759 A1 * | 10/2018 | Cho | F04D 29/321 |

OTHER PUBLICATIONS

Written Opinion of 0the International Searching Authority dated Jun. 20, 2017 in International (PCT) Application No. PCT/JP2017/013168, with English Translation.

* cited by examiner

COMPRESSOR ROTOR, COMPRESSOR AND GAS TURBINE

CROSS-REFERENCE TO RELATED APPLICATION

Priority is claimed from Japanese Patent Application No. 2016-068191, filed Mar. 30, 2016, the content of which is incorporated herein by reference.

TECHNICAL FIELD

The present invention relates to a compressor rotor, a compressor and a gas turbine.

BACKGROUND ART

A compressor includes a casing, and a rotor that rotates about an axis in the casing. The rotor of an axial flow compressor has a rotor main body extending in an axial direction around the axis, and a plurality of rotating blade rows fixed to an outer circumference of the rotor main body and arranged in the axial direction.

Japanese Unexamined Patent Application, First Publication No. 2011-208640 discloses a compressor rotor provided with flow passages through which an air flow for cooling the rotating blades flows, and a chamber (cavity) for controlling the air flow flowing through the flow passages. The flow passages are separated from each other so that the rotational velocity of the air flow flowing along the flow passages and the rotational velocity of a mechanical component (a rotor) coincide with each other in order to avoid a pressure loss of the compressor rotor.

CITATION LIST

Patent Document

Patent Document 1: Japanese Unexamined Patent Application, First

SUMMARY OF INVENTION

Technical Problem

The rotor described in Japanese Unexamined Patent Application, First Publication No. 2011-208640 controls the temperature of the rotating blade of the turbine by causing the air flow to flow along the flow passages. Since the turbine cooling air passes through the inside of the compressor rotor, the rotor is also heated or cooled, but the inflow and outflow of the air flow to and from the flow passage are not sufficiently controlled, and the temperature controllability of the compressor rotor is not enough.

Accordingly, an object of the present invention is to provide a compressor rotor, a compressor and a gas turbine capable of sufficiently enhancing the thermal responsiveness of the rotor main body with respect to a temperature change of air pressure-fed by the rotating blade.

Solution to Problem

In order to solve the above problem, the present invention proposes the following solutions.

A compressor rotor according to a first aspect of the present invention includes a rotor main body extending in an axial direction thereof; a plurality of rotating blades formed on an outer circumference of the rotor main body at intervals in a circumferential direction and configured to feed a fluid with pressure by rotating about the axis together with the rotor main body; a first outer cavity formed in the rotor main body and into which air on a high-pressure side of the rotating blades is introduced; a first inner cavity formed on an inner side in a radial direction of the first outer cavity in the rotor main body; and a first communication passage communicating the first outer cavity with the first inner cavity in the radial direction, wherein, along the entirely length of the first communication passage from the first outer cavity to the first inner cavity, the first communication passage is inclined toward a forward side of a rotation direction of the rotor main body.

With such a configuration, it is possible to allow the air introduced into the first outer cavity to flow into the first inner cavity via the first communication passage.

Further, since the first communication passage is inclined in a predetermined direction, the direction of the air flowing out from the first communication passage to the first inner cavity coincides with the direction of the air flowing in the first inner cavity by the rotation of the rotor main body. As a result, a swirl flow velocity in the first inner cavity becomes relatively faster than a circumferential velocity of the rotor main body.

In general, it is known that, as the relative velocity of air to the wall surface increases, the heat transfer coefficient to the wall increases. That is, by increasing the relative velocity difference between the circumferential velocity of the rotor main body and the swirl flow velocity in the first inner cavity, it is possible to increase the heat transfer coefficient to the wall surface defining the cavity. Therefore, in the compressor rotor, it is possible to sufficiently increase the thermal responsiveness of the compressor rotor with respect to the temperature change of the air flowing through the air compression flow passage.

In the compressor rotor according to a second aspect of the present invention, the rotor main body may be further provided with a second outer cavity formed on a low-pressure side in the axial direction from the first outer cavity, a second inner cavity formed on an inner side in the radial direction of the second outer cavity, a second communication passage through which the second inner cavity and the second outer cavity communicate with each other in the radial direction, and an axial flow passage which connects the first inner cavity and the second inner cavity to each other in the axial direction.

With such a configuration, it is possible to form a flow of air inside the rotor main body, using the pressure difference in the axial direction in the air compression flow passage through which the air pressure-fed by the rotating blades flows as the driving force. The air flowing from the air compression flow passage into the first outer cavity flows in the order of the first communication passage, the first inner cavity, the axial flow passage, the second inner cavity, and the second outer cavity, and finally refluxes to the air compression flow passage. That is, the compressor rotor can efficiently increase the thermal responsiveness using the air in the air compression flow passage.

In the compressor rotor according to a third aspect of the present invention, along the entirely length of the second communication passage from the second inner cavity to the second outer cavity, the second communication passage is inclined toward a backward side of a rotation direction of the rotor main body.

With such a configuration, the direction of the air flowing out from the second communication passage to the second outer cavity is opposite to the direction of the air flowing in the second outer cavity by the rotation of the rotor. Therefore, the swirl flow velocity in the second outer cavity relatively decreases with respect to the circumferential velocity of the rotor main body. That is, the relative velocity difference between the circumferential velocity of the rotor main body and the swirl flow velocity in the second outer cavity increases, and it is possible to increase the heat transfer coefficient from the air in the second outer cavity to the wall surface defining the cavity. Therefore, in the compressor rotor, it is possible to further increase the thermal responsiveness of the compressor rotor with respect to the temperature change of the air flowing through the air compression flow passage.

In the compressor rotor according to a fourth aspect of the present invention may include a spindle bolt passing through the axial flow passage in the axial direction, wherein the spindle bolt is positioned different from a position on an extension line of a central axis of the first communication passage.

With such a configuration, it is possible to prevent the air flowing out from the first communication passage from decelerating due to collision with the spindle bolt. That is, it is possible to avoid a decrease in the swirl flow velocity of the air flowing in the first inner cavity, and it is possible to further increase the heat transfer coefficient to the wall surface defining the cavity.

In the compressor rotor according to a fifth aspect of the present invention, a cross-section perpendicular to the extending direction of the first communication passage may have a circular shape.

With such a configuration, the pressure loss when air flows into the first communication passage decreases. In other words, it is possible to more efficiently increase the thermal responsiveness of the compressor rotor with respect to the temperature change of the air flowing through the air compression flow passage.

In the compressor rotor according to a sixth aspect of the present invention, the cross-section perpendicular to the extending direction of the second communication passage may have a circular shape.

With such a configuration, the pressure loss when air flows into the second communication passage decreases. In other words, it is possible to more efficiently increase the thermal responsiveness of the compressor rotor with respect to the temperature change of the air flowing through the air compression flow passage.

In the compressor rotor according to a seventh aspect of the present invention, a central axis of the first communication passage in the extending direction may be as a straight line.

With such a configuration, it is possible to easily process the first communication passage which connects the first outer cavity and the first inner cavity. Therefore, the manufacturing cost of the compressor rotor can be suppressed.

In the compressor rotor according to an eighth aspect of the present invention, a central axis of the second communication passage in the extending direction may be as a straight line.

With such a configuration, it is easy to process the second communication passage which connects the second outer cavity and the second inner cavity. That is, the manufacturing cost of the compressor rotor can be suppressed.

In the compressor rotor according to a ninth aspect of the present invention, a diameter of a first inflow surface which is a contact point between the first communication passage and the first outer cavity may be greater than a diameter of a first outflow surface which is a contact point between the first communication passage and the first inner cavity.

By setting the diameter of the inflow surface to be greater than the diameter of the outflow surface in this way, the flow velocity of the air flowing out from the first outflow surface increases as compared with the flow velocity of the air flowing in from the first inflow surface. Therefore, the relative velocity difference between the swirl flow velocity of the air flowing in the first inner cavity and the circumferential velocity of the first inner cavity itself increases, and the heat transfer coefficient to the wall surface defining the cavity can be increased.

In the compressor rotor according to a tenth aspect of the present invention, a diameter of a second inflow surface which is a contact point between the second communication passage and the second inner cavity may be greater than a diameter of a second outflow surface which is a contact point between the second communication passage and the second outer cavity.

By setting the diameter of the inflow surface to be greater than the diameter of the outflow surface in this way, it is possible to increase the flow velocity of the air flowing out from the second outflow surface as compared with the flow velocity of the air flowing in from the second inflow surface. Thus, since the relative velocity difference between the swirl flow velocity of the air flowing in the second outer cavity and the circumferential velocity of the second outer cavity itself increases, the heat transfer coefficient to the wall surface defining the cavity can be increased.

In the compressor rotor according to an eleventh aspect of the present invention, a central axis of the first communication passage may be inclined at an inclined angle of 10° or more and 80° or less with respect to the radial direction of the rotor main body.

With such a configuration, it is possible to increase the relative velocity of the air flowing out from the first communication passage to the first inner cavity with respect to the rotor main body. When the inclined angle of the rotor main body with respect to the radial direction increases, the degree of coincidence between the direction of the air flowing out from the first communication passage to the first inner cavity and the direction of the air flowing in the first inner cavity rises. That is, since the relative velocity difference between the swirl flow velocity of the air flowing in the first inner cavity and the circumferential velocity of the first inner cavity itself increases, the heat transfer coefficient to the wall surface defining the cavity can be increased.

In the compressor rotor according to a twelfth aspect of the present invention, a central axis of the second communication passage may be inclined at an inclined angle of 10° or more and 80° or less with respect to the radial direction of the rotor main body.

With such a configuration, it is possible to increase the relative velocity difference between the swirl flow velocity of the air flowing from the second communication passage to the second outer cavity and the circumferential velocity of the rotor main body. When the inclined angle of the rotor main body with respect to the radial direction increases, the direction of the air flowing out from the second communication passage to the second outer cavity is opposite to the direction of the air flowing in the second outer cavity. That is, the swirl flow velocity of the air flowing in the second outer cavity relatively decreases with respect to the circumferential velocity of the second outer cavity itself, and the relative velocity difference therebetween increases. As a result, the heat transfer coefficient exerted by the air in the second outer cavity on the wall surface defining the cavity increases.

A compressor according to a thirteenth aspect of the present invention may include the above-described compressor rotor, and a compressor casing which covers the compressor rotor.

With such a configuration, it is possible to avoid the influence of thermal elongation caused by a difference in heat capacity between the compressor rotor and the compressor casing, and it is possible to reduce the steady clearance. As a result, it is possible to achieve a compressor having high compression efficiency.

A gas turbine according to a fourteenth aspect of the present invention may include the above-described compressor; a combustor which combusts fuel in air compressed by the compressor to generate a combustion gas; and a turbine driven by the combustion gas.

With such a configuration, a gas turbine with high compression efficiency can be achieved.

Advantageous Effects of Invention

According to the present invention, it is possible to sufficiently increase the thermal responsiveness of the rotor main body in the compressor.

BRIEF DESCRIPTION OF DRAWINGS

FIG. 4 is a view illustrating a rotor disk according to the first embodiment of the present invention, in which FIG. 4A is a cross-sectional view of the rotor disk, and FIG. 4B is a plan view of a surface of an upstream side of the rotor disk viewed from the axial direction.

DESCRIPTION OF EMBODIMENTS

Hereinafter, embodiments to which the present invention is applied will be described in detail with reference to the drawings. The drawings used in the following description are for illustrating the configuration of the embodiments of the present invention, and the sizes, thicknesses, dimensions, and the like of the respective parts illustrated are different from the actual dimensional relationships of the gas turbine.

First Embodiment

Figure 1:
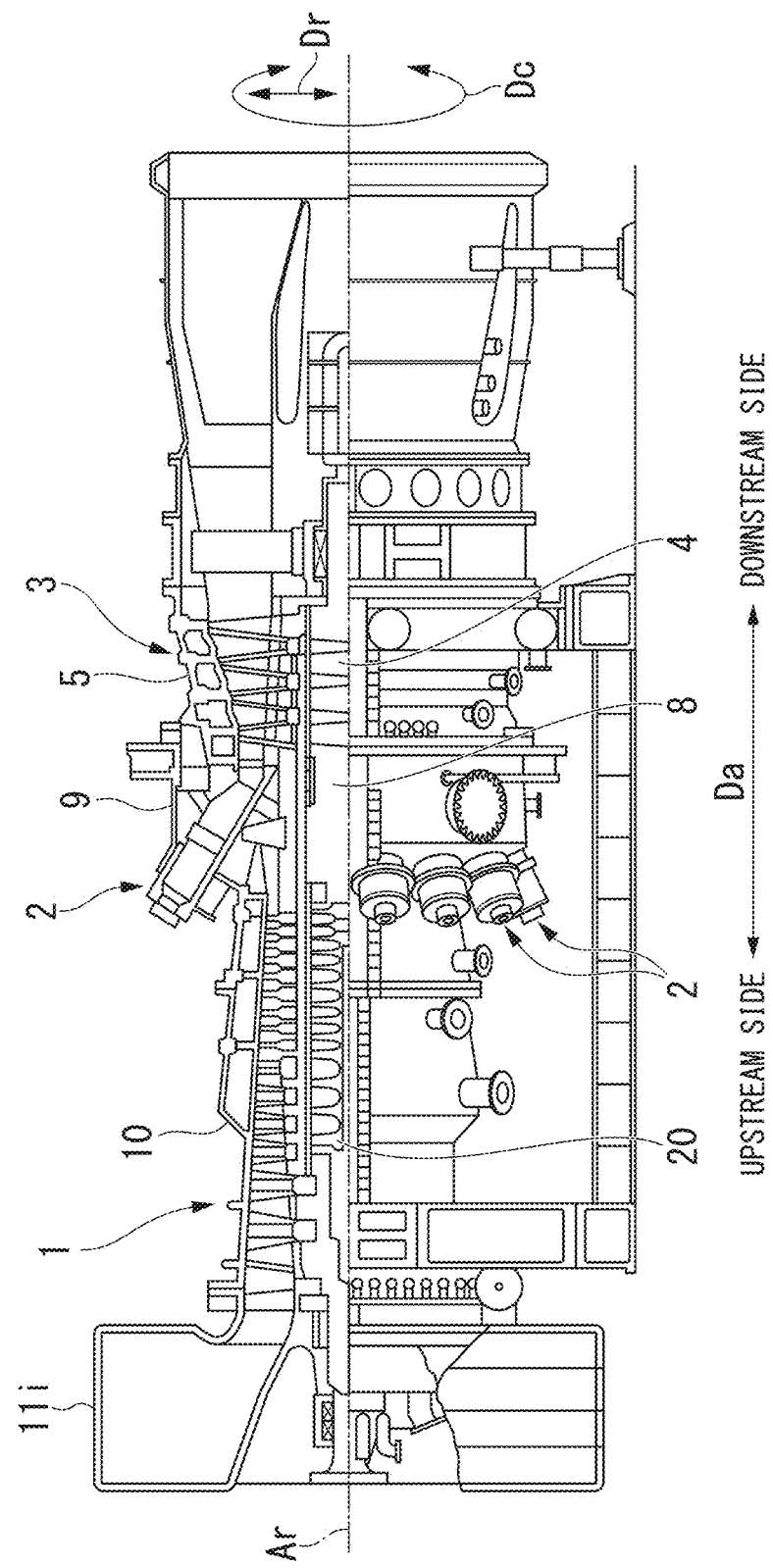
FIG. 1 is a cutaway side view of a main part of a gas turbine according to a first embodiment of the present invention.

FIG. 1 is a cutaway side view of a main part of a gas turbine according to the first embodiment of the present invention. As illustrated in FIG. 1, the gas turbine of the first embodiment includes a compressor 1 that compresses the outside air to generate compressed air, a combustor 2 that mixes fuel from a fuel supply source with the compressed air and burns the mixture to generate a combustion gas, and a turbine 3 driven by the combustion gas.

The compressor 1 has a compressor rotor 20 that rotates about an axis Ar, and a cylindrical compressor casing 10 that covers the compressor rotor 20. An opening is formed on an upstream side of the compressor casing 10. The opening forms an inlet 11i through which the compressor 1 takes in air from the outside.

Here, each direction in the compressor 1 is defined. In the present invention, a direction in which the axis Ar extends (extending direction) is referred to as the axial direction Da. Further, an inlet 11i side in the axial direction Da is referred to as an upstream side, and an opposite side to the inlet 11i in the axial direction is referred to as a downstream side. A radial direction based on the axis Ar is referred to as a radial direction Dr. Also, a side away from the axis Ar in the radial direction Dr is referred to as a radially outer side, and a side toward the axis Ar in the radial direction Dr is referred to as a radially inner side. Further, a circumferential direction around the axis Ar as a central axis is referred to as a circumferential direction Dc.

The turbine 3 is disposed on a downstream side of the compressor 1. The turbine 3 has a turbine rotor 4 that rotates around an axis Ar, and a cylindrical turbine casing 5 that covers the turbine rotor 4. Since the compressor rotor 20 and the turbine rotor 4 rotate around the same axis Ar, the compressor rotor 20 and the turbine rotor 4 are connected to each other to form a gas turbine rotor 8. The compressor casing 10 and the turbine casing 5 are connected to each other to form a gas turbine casing 9. The combustor 2 is fixed to the gas turbine casing 9.

Figure 2:
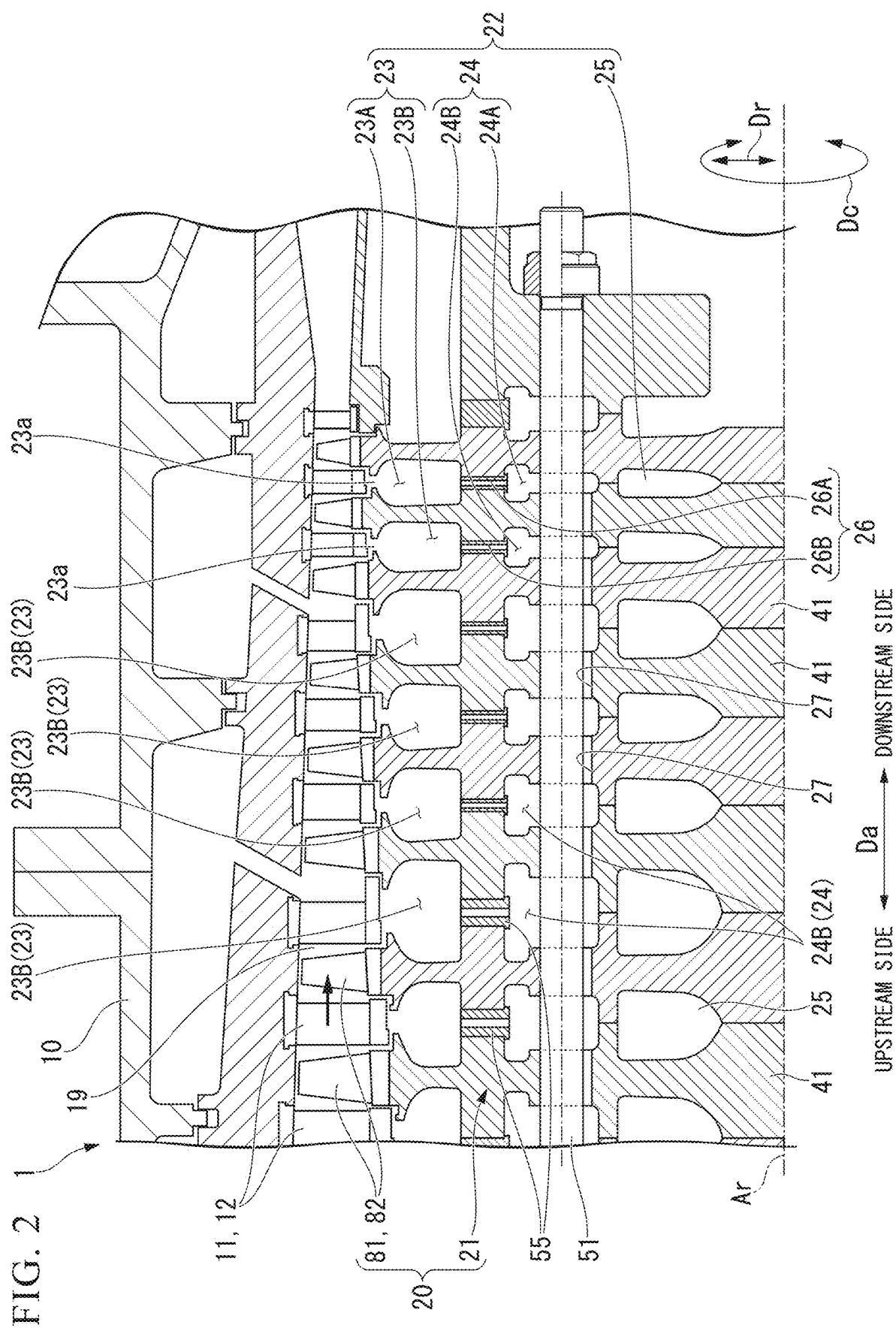
FIG. 2 is a cross-sectional view of the main part of the compressor according to the first embodiment of the present invention.

FIG. 2 is a cross-sectional view of a main part of the compressor according to the first embodiment of the present invention. In FIG. 2, the same constituent parts as those in FIG. 1 are denoted by the same reference numerals.

Referring to FIG. 2, the compressor 1 has a compressor rotor 20 rotating about an axis Ar, and a cylindrical compressor casing 10 which covers the compressor rotor 20. An axial flow compressor will be described below as an example of the compressor 1.

The compressor rotor 20 has a rotor main body 21 extending in the axial direction Da around the axis Ar, and a plurality of rotating blade rows 81 fixed to the outer circumference of the rotor main body 21 and aligned in the axial direction Da. One rotating blade row 81 has a plurality of rotating blades 82. The plurality of rotating blades 82 are aligned in the circumferential direction Dc around the axis Ar, and constitute one rotating blade row 81.

The compressor casing 10 has a stationary vane row 11 formed on its inner circumference. The stationary vane row 11 is fixed at a position on the downstream side of each of the rotating blade rows 81. One stationary vane row 11 has a plurality of stationary vanes 12. The plurality of stationary vanes 12 are aligned in the circumferential direction Dc around the axis Ar, and constitute one stationary vane row 11.

Figure 3:
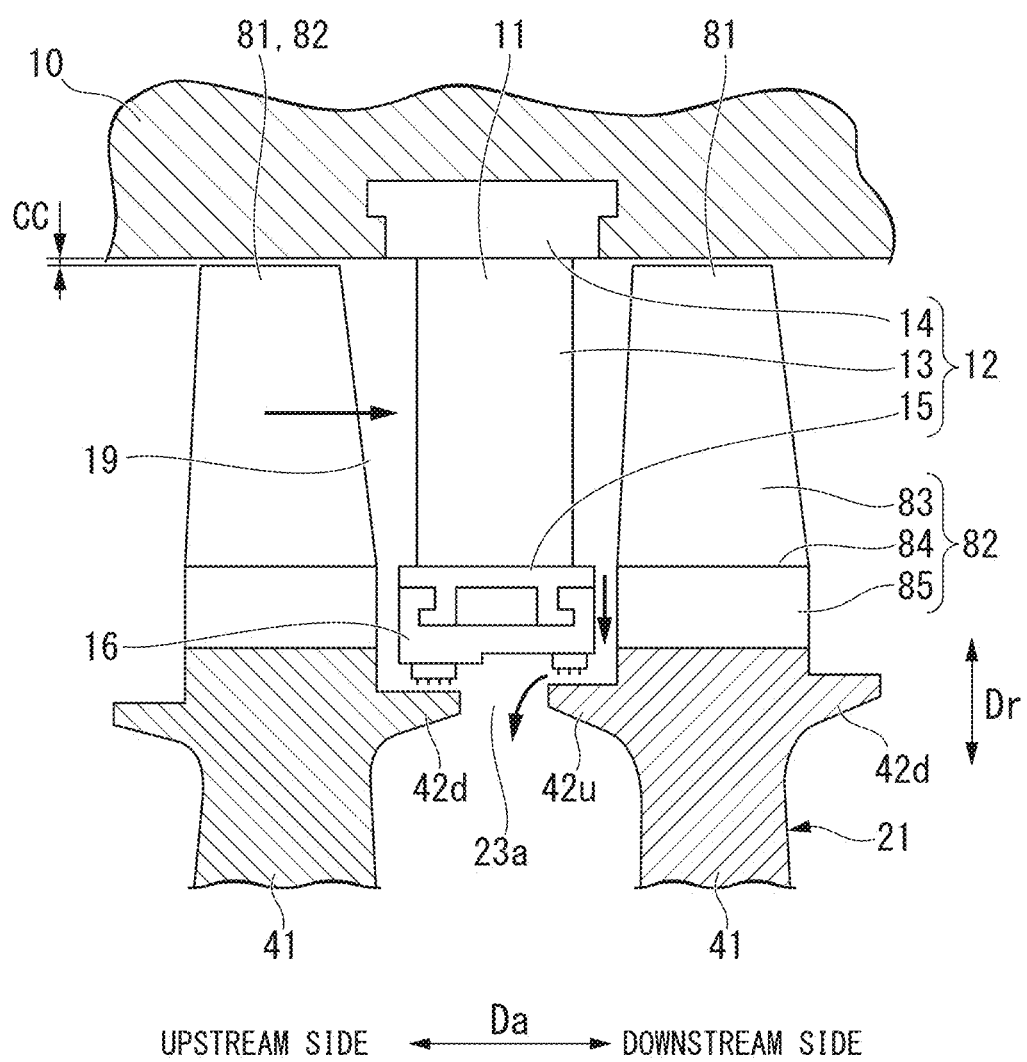
FIG. 3 is a cross-sectional view of the main part around a rotating blade and a stationary vane of the compressor according to the first embodiment of the present invention

FIG. 3 is a cross-sectional view of a main part around the rotating blade and the stationary vane of the compressor according to the first embodiment of the present invention. In FIG. 3, the same constituent parts as those in FIG. 2 are denoted by the same reference numerals.

As illustrated in FIGS. 2 and 3, the stationary vane 12 includes a vane body 13 extending in the radial direction Dr, an outer shroud 14 provided outside the vane body 13 in the radial direction Dr, and an inner shroud 15 provided inside the vane body 13 in the radial direction Dr. The outer shroud 14 is attached to the inner circumference of the compressor casing 10. A seal ring 16 is provided inside the inner shroud 15 in the radial direction Dr.

The rotating blades 82 have a blade body 83 extending in the radial direction Dr, a platform 84 provided inside the blade body 83 in the radial direction Dr, and a blade root 85 provided inside the platform 84 in the radial direction Dr. The blade root 85 is embedded in the rotor main body 21.

An air compression flow passage 19 is formed between the compressor rotor 20 and the compressor casing 10. The air compression flow passage 19 is annularly formed around the axis Ar. The air flows from the upstream side to the downstream side while being compressed in the air compression flow passage 19 by the rotation of the compressor rotor 20.

The rotor main body 21 constituting the compressor rotor 20 has a plurality of rotor disks 41, a spindle bolt 51, and a torque pin 55.

The plurality of rotor disks 41 are stacked in the axial direction Da. Each of the rotor disks 41 has concave portions on a stacked surface, and a plurality of cavities 22 which are separated from each other in the axial direction Da by being stacked are formed.

The plurality of cavities 22 have a plurality of outer cavities 23 and a plurality of inner cavities 24. Further, an axial center side cavity 25 provided further inside than the inner cavity 24 may be provided.

The outer cavity 23 is provided at a position between the axial directions Da of the plurality of rotating blade rows 81. That is, the outer cavity 23 is provided at a position facing the plurality of stationary vane rows 11 in the axial direction Da. The outer cavity 23 has an opening 23a with respect to the air compression flow passage 19. The outer cavity 23 is annularly formed around the axis Ar.

The outer cavity 23 has a first outer cavity 23A and a second outer cavity 23B. The first outer cavity 23A and the second outer cavity 23B differ in the flowing direction of the air in a usage mode described later, but there is no great difference in the structure. In FIG. 2, the outer cavity 23 on the most downstream (high-pressure) side is defined as the first outer cavity 23A, and the outer cavity 23 on the upstream (low-pressure) side from the first outer cavity 23A is defined as the second outer cavity 23B.

In an actual usage mode, which range of the outer cavity 23 extends to the first outer cavity 23A depends on the pressure of the air flowing into the outer cavity 23 from the air compression flow passage 19, the pressure of the air flowing from the outer cavity 23 to the air compression flow passage 19, and the magnitude relationship.

The inner cavity 24 is formed inside the outer cavity 23 inside each outer cavity 23 in the radial direction Dr. The inner cavity 24 is annularly formed around the axis Ar.

The inner cavity 24 has a first inner cavity 24A and a second inner cavity 24B. The first inner cavity 24A is the inner cavity 24 located inside the first outer cavity 23A in the radial direction Dr.

The second inner cavity 24B is the inner cavity 24 located inside the second outer cavity 23B in the radial direction Dr. The first inner cavity 24A and the second inner cavity 24B differ in the flowing direction of the air in the usage mode described later, but there is no great difference in the structure.

Figure 4:
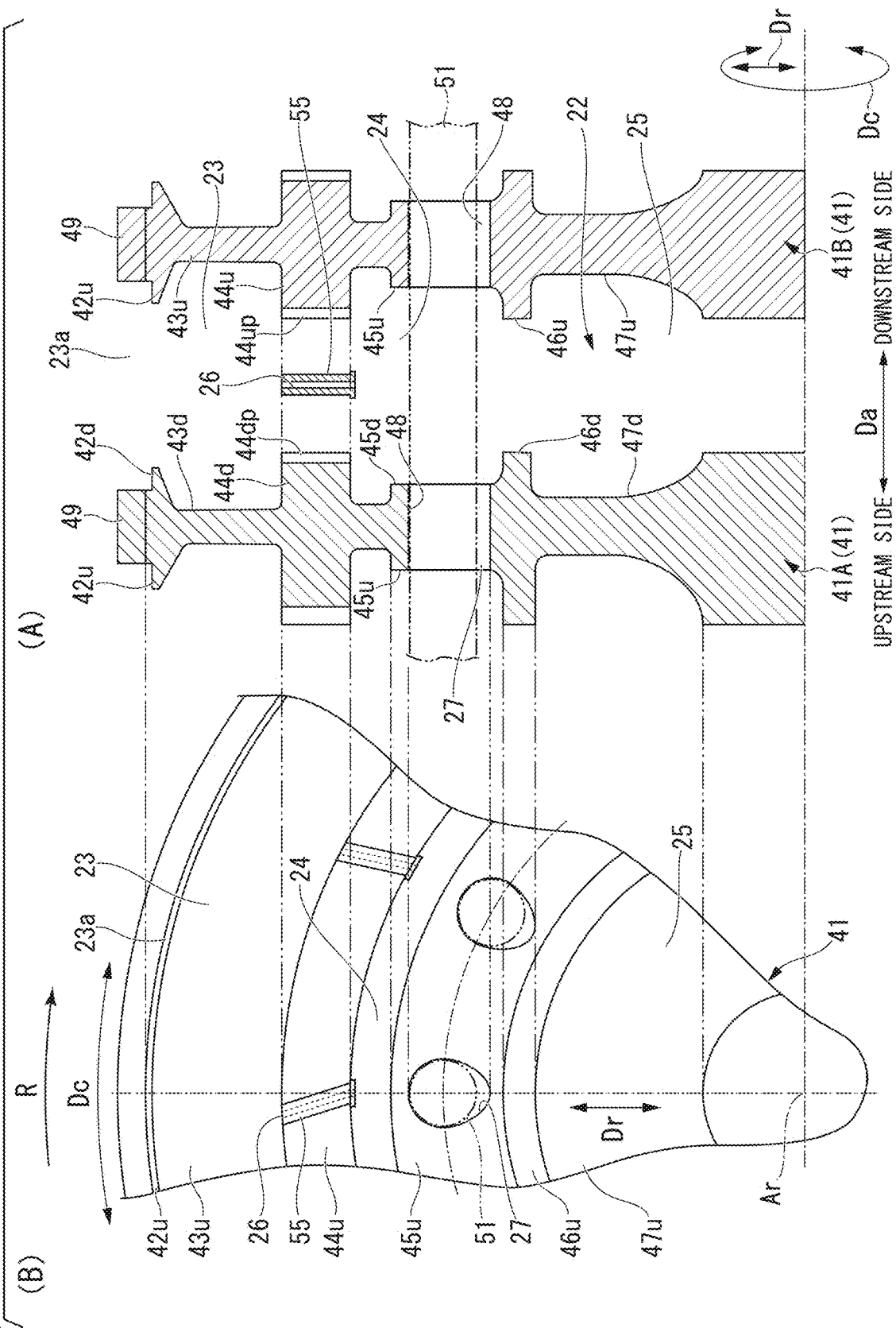

FIG. 4 is a view illustrating the rotor disk according to the first embodiment of the present invention, in which FIG. 4A is a cross-sectional view of the rotor disk, and FIG. 4B is a plan view of a surface of the rotor disk on the upstream side as viewed from the axial direction. In FIG. 4, the same constituent parts as the structure illustrated in FIG. 2 are denoted by the same reference numerals.

As illustrated in FIG. 4, the cavity 22 is partitioned by a surface on the upstream side of one rotor disk 41, and a surface on the downstream side of another rotor disk 41 disposed adjacent to the upstream side of the rotor disk 41. Hereinafter, for convenience of description, an arbitrary rotor disk 41 is referred to as an upstream disk 41A, and a rotor disk 41 adjacent to the downstream side of the upstream disk 41A is referred to as a downstream disk 41B.

On the surface on the downstream side of the upstream disk 41A, a downstream surface first concave portion 43d, a downstream surface second concave portion 45d, and a downstream surface third concave portion 47d which are recessed toward the upstream side are formed. Further, a downstream surface first arm portion 42d, a downstream surface second arm portion 44d, and a downstream surface third arm portion 46d which relatively protrude toward the downstream side with respect to the concave portions are formed. Each portion is formed annularly around the axis Ar.

On the other hand, on the surface on the upstream side of the downstream disk 41B, an upstream surface first concave portion 43u, an upstream surface second concave portion 45u, and an upstream surface third concave portion 47u which are recessed toward the downstream side are formed. Also, an upstream surface first arm portion 42u, an upstream surface second arm portion 44u, and an upstream surface third arm portion 46u which relatively protrude toward the upstream side with respect to the concave portions are formed. Each portion is formed annularly around the axis Ar.

The downstream surface first concave portion 43d and the upstream surface first concave portion 43u, the downstream surface second concave portion 45d and the upstream surface second concave portion 45u, the downstream surface third concave portion 47d and the upstream surface third concave portion 47u, the downstream surface first arm portion 42d and the upstream surface first arm portion 42u, the downstream surface second arm portion 44d and the upstream surface second arm portion 44u, and the downstream surface third arm portion 46d and the upstream surface third arm portion 46u are located at the same position with respect to each other in the radial direction Dr, and face each other in the axial direction Da.

In a state in which the surface on the downstream side of the upstream disk 41A and the surface on the upstream side of the downstream disk 41B are in close contact with each other in the actual usage mode, the downstream surface second arm portion 44d and the upstream surface second arm portion 44u, and the downstream surface third arm portions 46d and the upstream surface third arm portions 46u are brought into close contact with each other. The downstream surface first arm portion 42d and the upstream surface first arm portion 42u are spaced apart from each other with a predetermined gap in the axial direction Da.

The outer cavity 23 is defined by the downstream surface first arm portion 42d, the upstream surface first arm portion 42u, the downstream surface first concave portion 43d, the upstream surface first concave portion 43u, the downstream surface second arm portion 44d, and the upstream surface second arm portion 44u. The gap between the downstream surface first arm portion 42d and the upstream surface first arm portion 42u becomes an opening 23a to the air compression flow passage 19 of the outer cavity 23.

The inner cavity 24 is defined by the downstream surface second arm portion 44d, the upstream surface second arm portion 44u, a downstream surface second concave portion 45d, the upstream surface second concave portion 45u, the downstream surface third arm portion 46d, and the upstream surface third arm portion 46u.

The axial center side cavity 25 is defined by the downstream surface third arm portion 46d, the upstream surface third arm portion 46u, the downstream surface third concave portion 47d, and the upstream surface third concave portion 47u.

Next, the torque pin 55 constituting the rotor main body 21 will be described with reference to FIGS. 2 and 4. The torque pin 55 is a columnar member that restricts relative rotation between mutually adjacent rotor disks 41. A plurality of torque pins 55 are formed between the adjacent rotor disks 41 in the circumferential direction Dc around the axis Ar.

The torque pins 55 are mounted in pin holes which are provided between the downstream surface second arm portion 44d and the upstream surface second arm portion 44u which are in close contact with each other, at interfaces in the circumferential direction Dc.

The pin holes are partitioned by a plurality of downstream surface pin grooves 44dp and a plurality of upstream surface pin grooves 44up facing each other.

The downstream surface pin groove 44dp is provided in an annular downstream surface second arm portion 44d to be recessed toward the upstream side and communicates the downstream surface first concave portion 43d and the downstream surface second concave portion 45d. The upstream surface pin groove 44up is provided in the annular upstream surface second arm portion 44u to be recessed toward the downstream side to allow the upstream surface first concave portion 43u and the upstream surface second concave portion 45u to communicate with each other.

An entire section of the pin hole is inclined in a predetermined direction with respect to the radial direction Dr when the rotor disk 41 is viewed in plan view from the axial direction Da. Therefore, the torque pin 55 inserted to the pin hole is also inclined in a predetermined direction with respect to the radial direction Dr when viewed in plan view from the axial direction Da.

The inclination direction is designed according to the rotation direction R at the time of driving the rotor disk 41 and is inclined toward the front side in the rotation direction R from the outer cavity 23 to the inner cavity 24. When viewed on the basis of the inner cavity 24, the inclination direction is inclined toward the rear side in the rotation direction R of the rotor main body 21 from the inner cavity 24 to the outer cavity 23.

Figure 5:
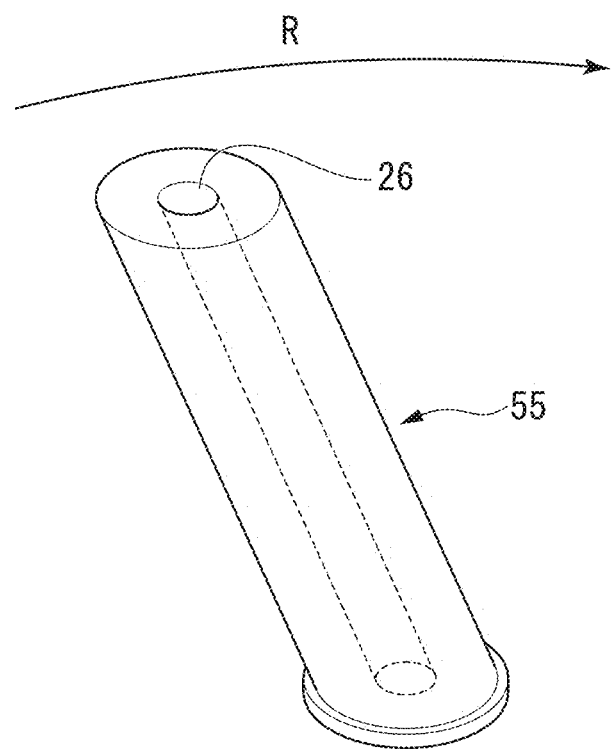
FIG. 5 is a perspective view of a torque pin according to the first embodiment of the present invention.

FIG. 5 is a perspective view of the torque pin according to the first embodiment of the present invention. In FIG. 5, the same constituent parts as those illustrated in FIGS. 2 and 4 are denoted by the same reference numerals.

Referring to FIG. 5, the torque pin 55 is a cylinder. The torque pin 55 has a communication passage 26 extending from one end surface to the other end surface. The communication passage 26 causes the outer cavity 23 and the inner cavity 24 to communicate with each other in the radial direction Dr.

Figure 6:
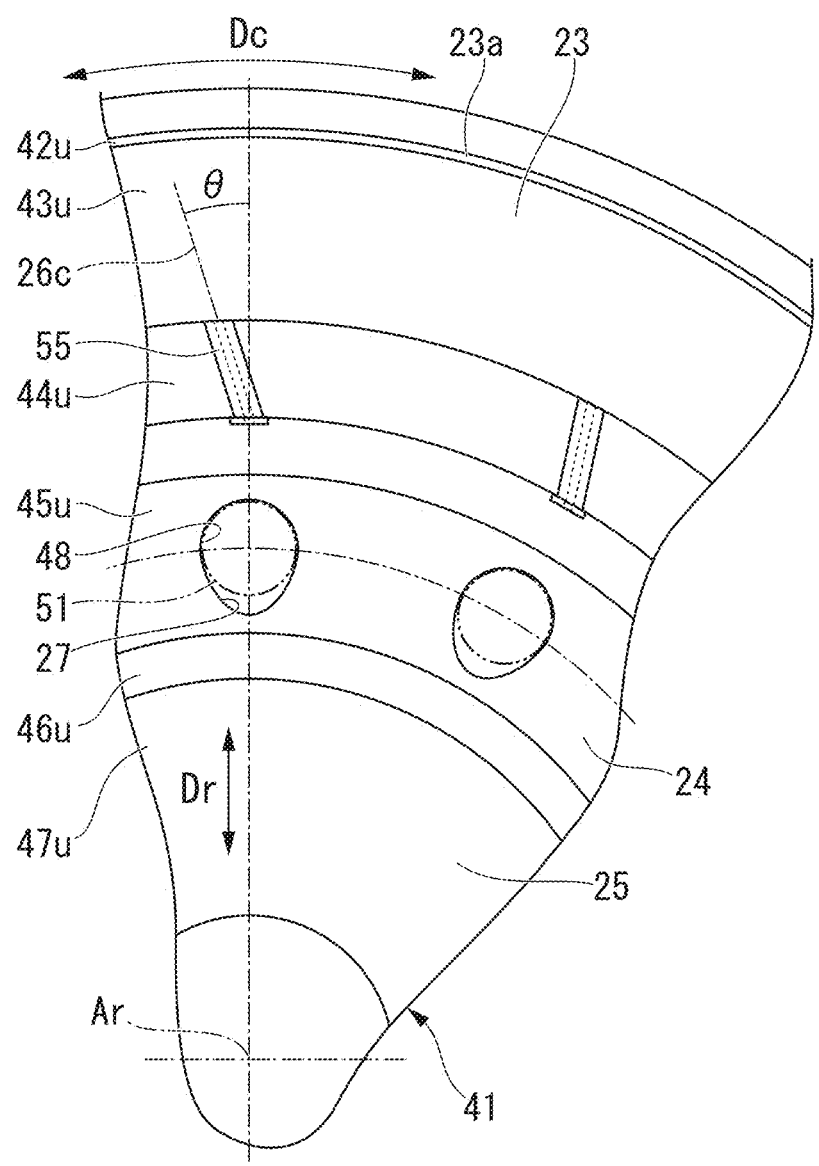
FIG. 6 is a plan view of a main part of the rotor disk according to the first embodiment of the present invention as seen in plan view from the axial direction.

The communication passage 26 through which the first outer cavity 23A and the first inner cavity 24A communicate with each other in the radial direction Dr is referred to as a first communication passage 26A, and the communication passage 26 through which the second outer cavity 23B and the second inner cavity 24B communicate with each other in the radial direction Dr is referred to as a second communication passage 26B (see FIG. 2). The first communication passage 26A and the second communication passage 26B have no structural difference. Herein, FIG. 6 illustrates an oval shape as an example of the shape of the through-hole 48. However, the through-hole 48 may have a shape such that the spindle bolt 51 can pass through the through-hole 48 with a gap 27. Specifically, the shape of the through-hole 48 may be, for example, circular.

The communication passage 26 is provided along the extending direction of the torque pin 55. The entirety of the communication passage 26 is inclined so that one end of the communication passage 26, which is close to the inner cavity 24, is positioned forward in the rotation direction of the rotor main body 21 with respect to the other end of the communication passage 26 which is close to the outer cavity 23.

FIG. 6 is a plan view of a main part of the rotor disk according to the first embodiment of the present invention in plan view from the axial direction. In FIG. 6, the same constituent parts as the structure illustrated in FIG. 4 are denoted by the same reference numerals.

As illustrated in FIG. 6, a central axis 26c of the communication passage 26 is inclined at an inclined angle θ with respect to the radial direction Dr. The central axis 26c of the communication passage 26 has a linear shape. The communication passage 26 in the cross section of the torque pin 55 cut along the plane perpendicular to the central axis 26c has a circular shape.

Next, the spindle bolt 51 constituting the rotor main body 21 will be described referring to FIG. 6. A plurality of spindle bolts 51 are provided side by side in the circumferential direction Dc around the axis Ar. The spindle bolt 51 passes through the plurality of rotor disks 41 in the stacking direction. The spindle bolt 51 stacks a plurality of rotor disks 41 to assemble the rotor main body 21.

The spindle bolt 51 passes through the through-hole 48 provided in the plurality of rotor disks 41 in the axial direction Da. In the through-hole 48, a gap between the spindle bolt 51 and the rotor disk 41 serves as the axial flow passage 27.

The axial flow passage 27 causes the adjacent inner cavities 24 to communicate with each other in the axial direction Da. The axial flow passage 27 is positioned further inside in the radial direction Dr than the central position of the inner cavity 24 in the radial direction Dr.

Figure 7:
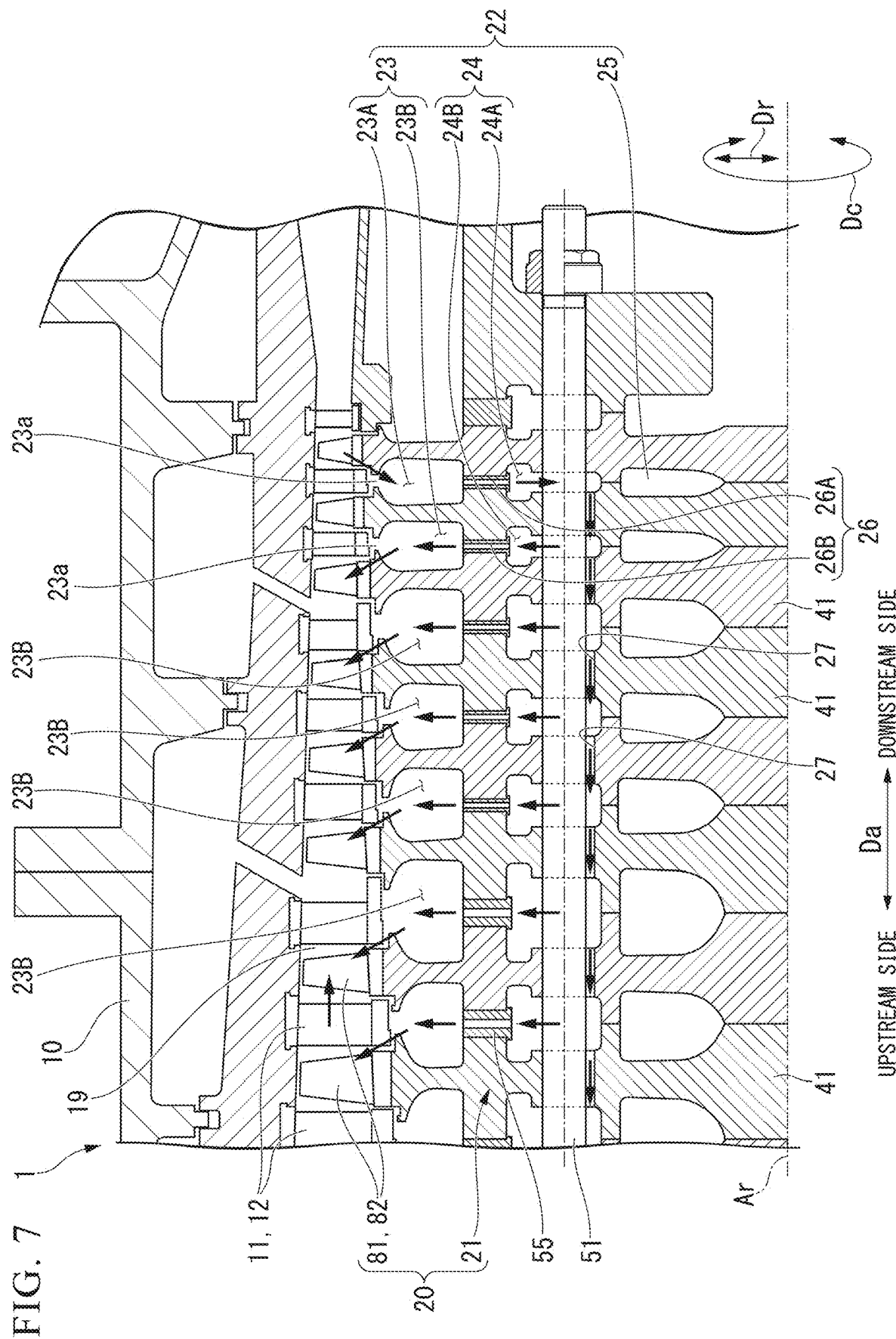
FIG. 7 is an explanatory diagram illustrating a flow of air in the compressor according to the first embodiment of the present invention.

FIG. 7 is an explanatory view illustrating the flow of air in the compressor according to the first embodiment of the present invention. In FIG. 7, the same constituent parts as the structure illustrated in FIG. 2 are denoted by the same reference numerals. Arrows illustrated in FIG. 7 indicate the flow of air.

Next, the flow of air in the compressor casing 10 will be described with reference to FIG. 7. The air supplied from the inlet 11i (see FIG. 1) of the compressor casing 10 flows into the air compression flow passage 19. The air is gradually compressed, while flowing in the air compression flow passage 19 to the downstream side. Therefore, the pressure in the air compression flow passage 19 is higher on the downstream side. Therefore, the pressure of the first outer cavity 23A communicating with the air compression flow passage 19 on the downstream side on the basis of the one rotating blade row 81 is higher than the pressure of the second outer cavity 23B communicating with the air compression flow passage 19 on the upstream side on the basis of the one rotating blade row 81. Therefore, the air in the air compression flow passage 19 flows into the first outer cavity 23A via the opening 23a.

The air flowing into the first outer cavity 23A from the opening 23a flows into the first inner cavity 24A via the first communication passage 26A formed in the torque pin 55. The air flowing into the first inner cavity 24A flows into each second inner cavity 24B via an axial flow passage 27 axially passing through the rotor disk 41. The air flowing into the second inner cavity 24B flows out from the opening 23a to the air compression flow passage 19 via the second outer cavity 23B.

That is, in the first embodiment, a pressure difference in the axial direction Da in the air compression flow passage 19 is used as a driving force, and a part of the air in the air compression flow passage 19 circulates in the rotor main body 21. The circulating flow promotes ventilation in the cavity 22 in the rotor main body 21.

Incidentally, as illustrated in FIG. 3, there is a clearance between the radially outer end of the rotating blade 82 and the inner circumferential surface of the compressor casing 10 facing the radially outer end in the radial direction Dr. The clearance is generally referred to as a tip clearance CC and is preferably as small as possible from the viewpoint of compressor performance.

In the compressor rotor 20, the dimension in the radial direction Dr is greater than the thickness dimension of the compressor casing 10 in the radial direction Dr. Therefore, the compressor rotor 20 has a great heat capacity with respect to the compressor casing 10, and the thermal responsiveness to the temperature change of the air flowing through the air compression flow passage 19 is lower than that of the compressor casing 10. Therefore, when the temperature of the air flowing through the air compression flow passage 19 varies, a change occurs in the tip clearance CC due to a difference in thermal responsiveness between the compressor rotor 20 and the compressor casing 10.

When the change in the tip clearance CC is large, it is necessary to increase the steady clearance. The steady clearance is the tip clearance CC when the stable operation of the gas turbine is continued and both the compressor rotor 20 and the compressor casing 10 are continuously at the same temperature. When the steady clearance is large, the air passing between the radially outer end of the rotating blades 82 and the inner circumferential surface of the compressor casing 10 increases at the time of the steady operation of the gas turbine. Therefore, if the steady clearance is large, not only the performance of the compressor at the time of the steady operation of the gas turbine is lowered but also the performance of the gas turbine is lowered.

In contrast, in the first embodiment, as described above, by causing the air in the air compression flow passage 19 to flow in the rotor main body 21, the thermal responsiveness of the compressor rotor 20 to the temperature change of the air flowing through the air compression flow passage 19 is increased. Therefore, the difference between the thermal expansion amounts of the compressor casing 10 and the compressor rotor 20 decreases. That is, the change amount of the tip clearance CC decreases.

In the first embodiment, since the change amount of the tip clearance CC is small, the steady clearance can be reduced. Therefore, in the first embodiment, the performance of the compressor at the time of the steady operation of the gas turbine can be increased, and as a result, the performance of the gas turbine can be increased.

Here, the reason why the thermal responsiveness of the compressor rotor 20 is improved in the first embodiment will be described.

First, the inflow of air in the first outer cavity 23A, the first communication passage 26A, and the first inner cavity 24A will be described.

Figure 8:
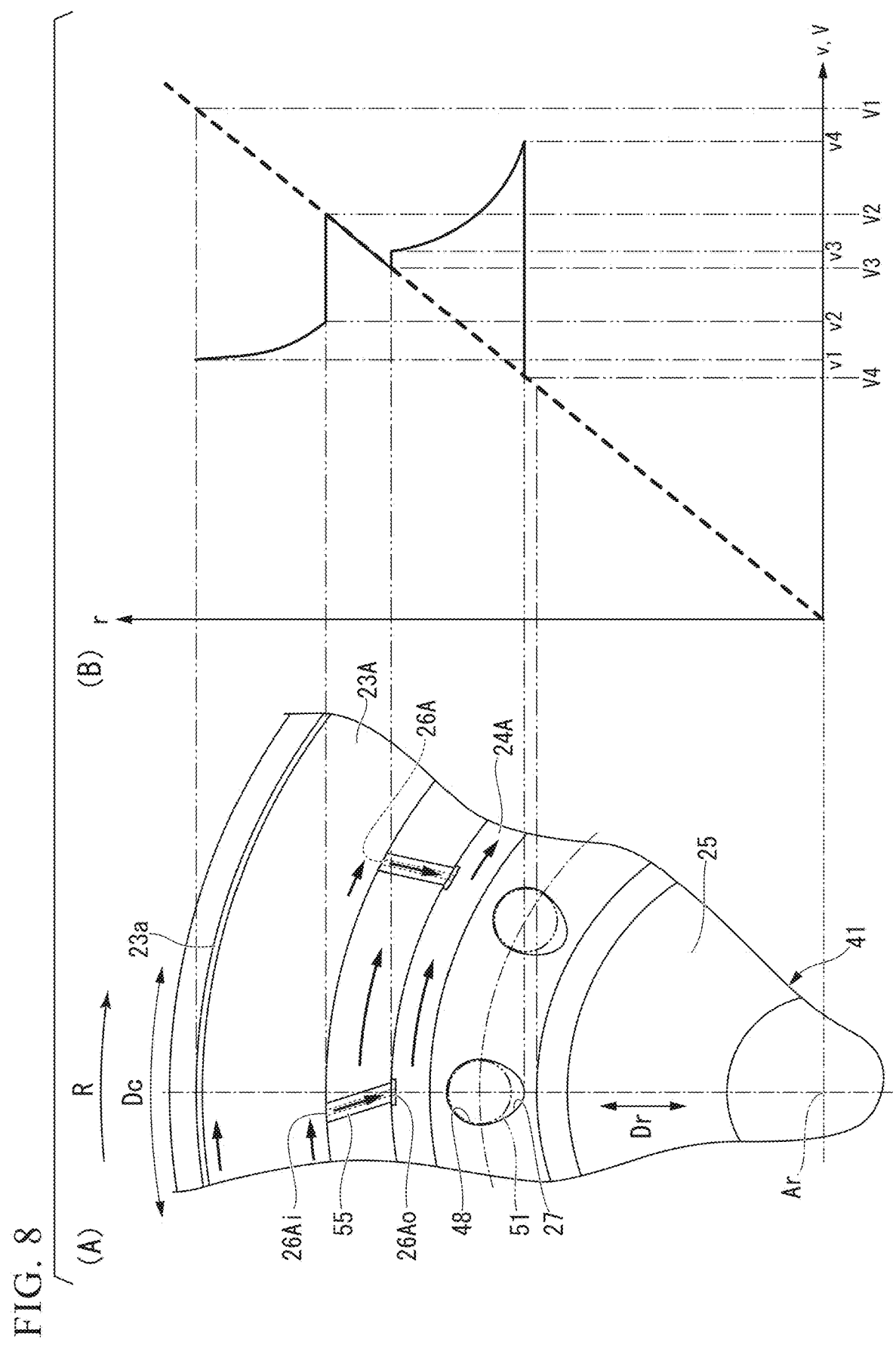
FIG. 8A is a plan view of the rotor disk of the first embodiment.
FIG. 8B is a graph illustrating a change in a circumferential velocity of air in the rotor.

FIG. 8 illustrates a plan view (A) of the rotor disk according to the first embodiment, and a circumferential velocity change (B) of the air inside the rotor. In FIG. 8B, a horizontal axis indicates the circumferential velocity v, V of the air or the rotor main body, and a vertical axis indicates the distance r from the axis Ar. Further, in FIG. 8, a thick broken line illustrates a circumferential velocity of the rotor main body 21, and a thin solid line illustrates a swirl flow velocity of the air in the rotor main body 21.

First, the circumferential velocity of the rotor main body 21 will be described. The rotor main body 21 rotates in the circumferential direction Dc around the axis Ar. Therefore, the velocity at the center of the rotor main body 21 is zero, and the circumferential velocity of the rotor main body 21 increases in proportion to the distance from the axis Ar. The circumferential velocity of the rotor main body 21 is the maximum on the outer circumferential surface, and the maximum circumferential velocity thereof is set to V1.

Next, the swirl flow velocity of the air in the rotor main body 21 will be described. As described above with reference to FIG. 7, the air in the air compression flow passage 19 flows into the first outer cavity 23A via the opening 23a. The swirl flow velocity of the air just after flowing into the first outer cavity 23A is defined as v1.

The air flowing into the first outer cavity 23A flows inward in the radial direction Dr, while flowing inside the first outer cavity 23A in the circumferential direction Dc relatively with respect to the first outer cavity 23A.

The swirl flow velocity of the air in the first outer cavity 23A increases as approaching the axis Ar due to the law of conservation of angular momentum. Therefore, the swirl flow velocity of the air gradually increases from the swirl flow velocity v1 just after flowing into the first outer cavity 23A toward the inner end in the radial direction Dr of the first outer cavity 23A. The swirl flow velocity of air at the inner end in the radial direction Dr of the first outer cavity 23A is defined as v2.

The air reaching the inner end in the radial direction Dr of the first outer cavity 23A flows into one of the plurality of first communication passages 26A. The first communication passage 26A is separated in the circumferential direction Dc, and the air in the first communication passage 26A rotates integrally with the rotor main body 21. Therefore, the circumferential velocity V2 at the position of the first inflow surface 26Ai of the first communication passage 26A of the rotor main body 21 is substantially the same.

Here, there is a circumferential velocity difference (v2-V2) between the circumferential velocity v2 of the air reaching the inner end in the radial direction Dr of the first outer cavity 23A and the circumferential velocity v2 of the first inflow surface 26Ai of the first communication passage 26A. Therefore, in view of the relative velocity, air flows into the first communication passage 26A from the direction opposite to the rotation direction R as viewed from the first communication passage 26A.

The air having passed through the first communication passage 26A flows into the first inner cavity 24A from the first outflow surface 26Ao. The entirety of the first communication passage 26A is inclined so that one end of the first communication passage 26A close to the first inner cavity 24A is positioned forward in the rotation direction R with respect to the other end of the first communication passage 26A close to the first outer cavity 23A. Therefore, the air flowing out from the first communication passage 26A includes the circumferential direction Dc component of the rotor main body 21. That is, since the direction of the air flowing out from the first communication passage 26A coincides with the rotation direction of the rotor main body 21, the swirl flow velocity v3 of the air just after flowing into the first inner cavity 24A becomes addition of the circumferential velocity V3 of the rotor main body 21 at the position of the first outflow surface 26Ao of the first communication passage 26A and the circumferential direction Dc component of the flow velocity of the air flowing out from the first outflow surface 26Ao of the first communication passage 26A.

Further, the air flowing into the first inner cavity 24A flows inward in the radial direction Dr, while flowing in the circumferential direction Dc relatively with respect to the first inner cavity 24A. Even in the first inner cavity 24A, the swirl flow velocity of the air increases as it flows inside the first inner cavity 24A inward in the radial direction Dr by the law of conservation of angular momentum. Just before reaching the plurality of axial flow passages 27, the swirl flow velocity of air becomes v4.

The air that has reached the axial flow passage 27 flows toward the upstream side and flows into the second inner cavity 24B. Since the axial flow passage 27 rotates integrally with the rotor main body 21 around the axis Ar, the circumferential velocity of the air integrally rotating with the inside of the axial flow passage 27 is almost the same as the circumferential velocity V4 of the rotor main body 21 at the position of the axial flow passage 27.

Figure 9:
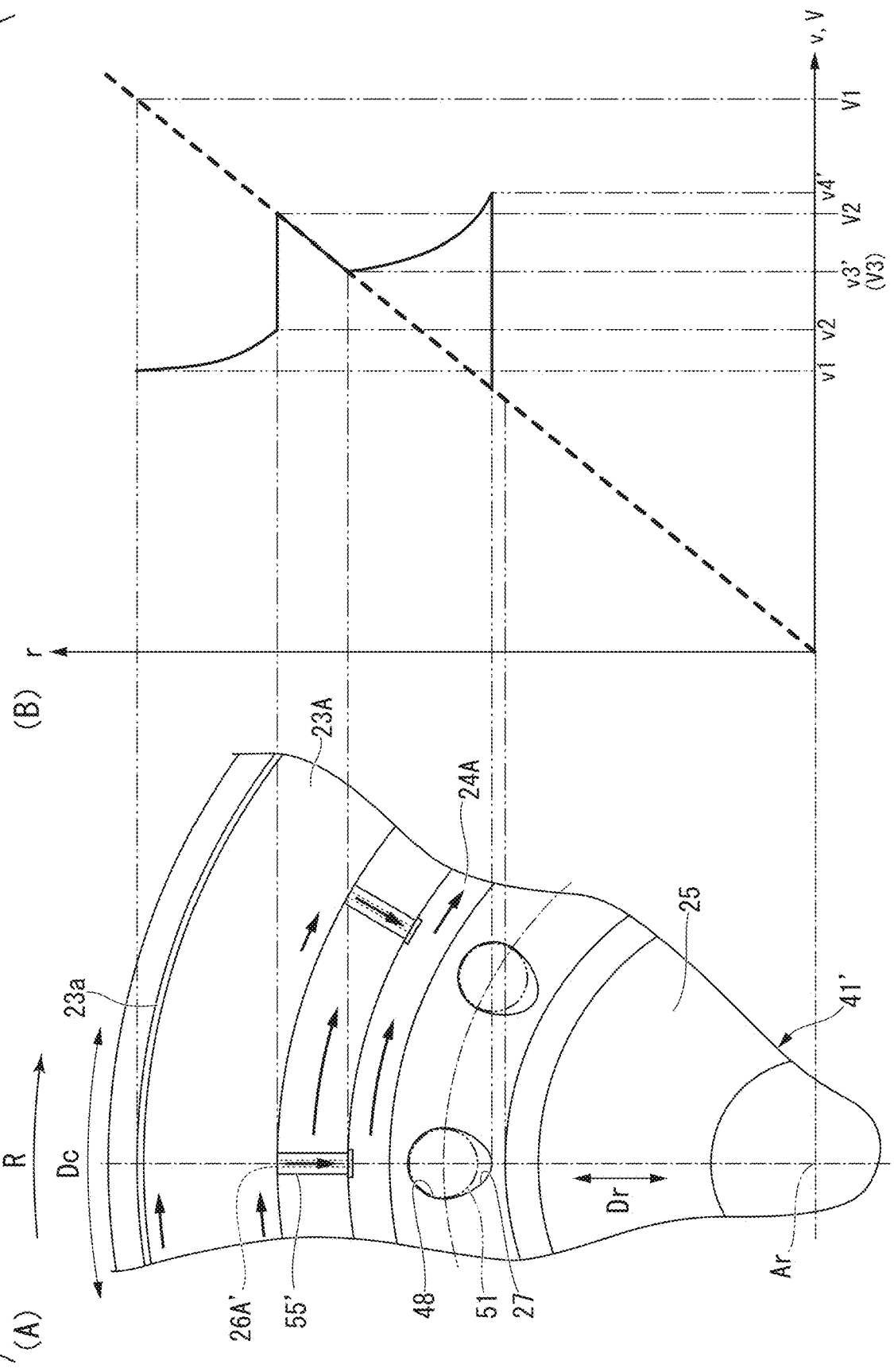
FIG. 9A is a plan view of a rotor disk of a comparative example.
FIG. 9B is a graph illustrating a change in the circumferential velocity of air in the rotor.

In contrast, the inflow of air in the compressor rotor of the comparative example will be described. FIG. 9 illustrates a plan view (A) of a rotor disk according to a comparative example, and a circumferential velocity change (B) of air inside the rotor. In FIG. 9, a thick broken line illustrates the circumferential velocity of the rotor main body 21, and a thin solid line illustrates the swirl flow velocity of the air in the rotor main body 21.

A rotor disk 41' according to the comparative example is different from the first communication passage 26A of the first embodiment in that a torque pin 55' extends in the radial direction Dr and a first communication passage 26A' is not inclined with respect to the radial direction Dr. Therefore, due to the difference in shape of the first communication passage, the condition under which the air flows into the first inner cavity 24A changes.

As illustrated in FIG. 9, the outflow direction of the air flowing out from the first communication passage 26A' coincides with the radial direction Dr, and the air flowing out from the first communication passage 26A' does not include the circumferential direction Dc component. That is, the swirl flow velocity v3' of the air just after flowing into the first inner cavity 24A substantially coincides with the circumferential velocity V3 of the rotor main body 21 at the position of the outflow surface of the first communication passage 26A'. Further, the swirl flow velocity increased as it flows through the inside of the first inner cavity 24A inward in the radial direction Dr becomes the swirl flow velocity v4' of air just before reaching the plurality of axial flow passages 27.

Figure 10:
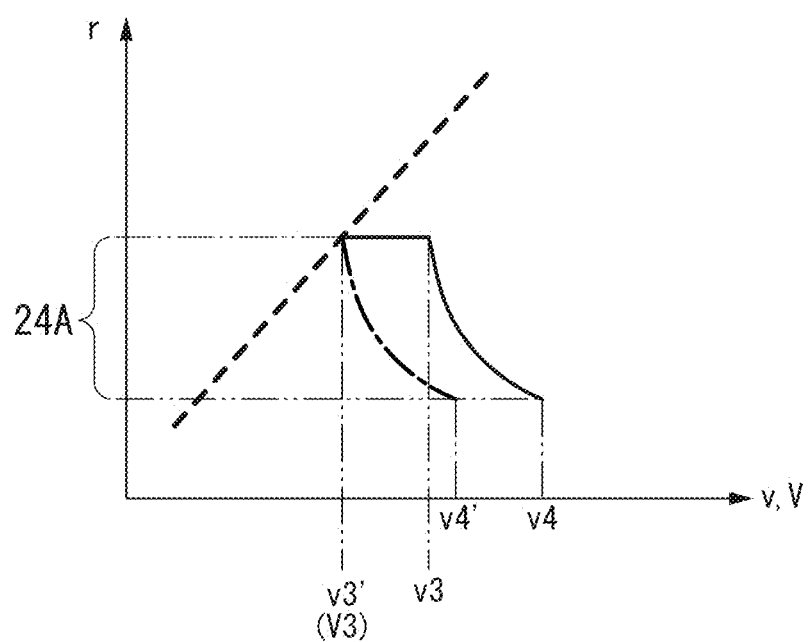
FIG. 10 is a graph obtained by comparing only a portion of a first inner cavity extracted from the graphs of FIGS. 8 and 9.

FIG. 10 is a graph comparing only the portion of the first inner cavity 24A extracted from the graphs of FIGS. 8 and 9. In FIG. 10, a horizontal axis represents the circumferential velocity v, V of the air or the rotor main body, and a vertical axis represents the distance r from the axis Ar. Further, in FIG. 10, a thick broken line illustrates the circumferential velocity of the rotor main body 21, a thin solid line illustrates the swirl flow velocity of the air in the first inner cavity 24A in the first embodiment, and an alternate long and short dashed line illustrates the swirl flow velocity of the first inner cavity 24A in the comparative example.

As illustrated in FIG. 10, the relative velocity difference between the swirl flow velocity of air in the first inner cavity 24A and the circumferential velocity of the rotor main body 21 in the first embodiment is greater than the relative velocity difference between the swirl flow velocity of air in the first inner cavity 24A and the circumferential velocity of the rotor main body 21 of the comparative example. That is, by inclining the first communication passage 26A in a predetermined direction, it is possible to increase the relative velocity difference between the swirl flow velocity of the air in the first inner cavity 24A and the circumferential velocity of the rotor main body 21.

It is known that, as the relative velocity of air to the wall surface increases, the heat transfer coefficient to the wall increases. That is, according to the compressor rotor 20 of the first embodiment, it is possible to increase the relative velocity difference between the circumferential velocity of the rotor main body 21 and the swirl flow velocity in the first inner cavity 24A, and the heat transfer coefficient to the wall surface defining the cavity can be increased.

Figure 11:
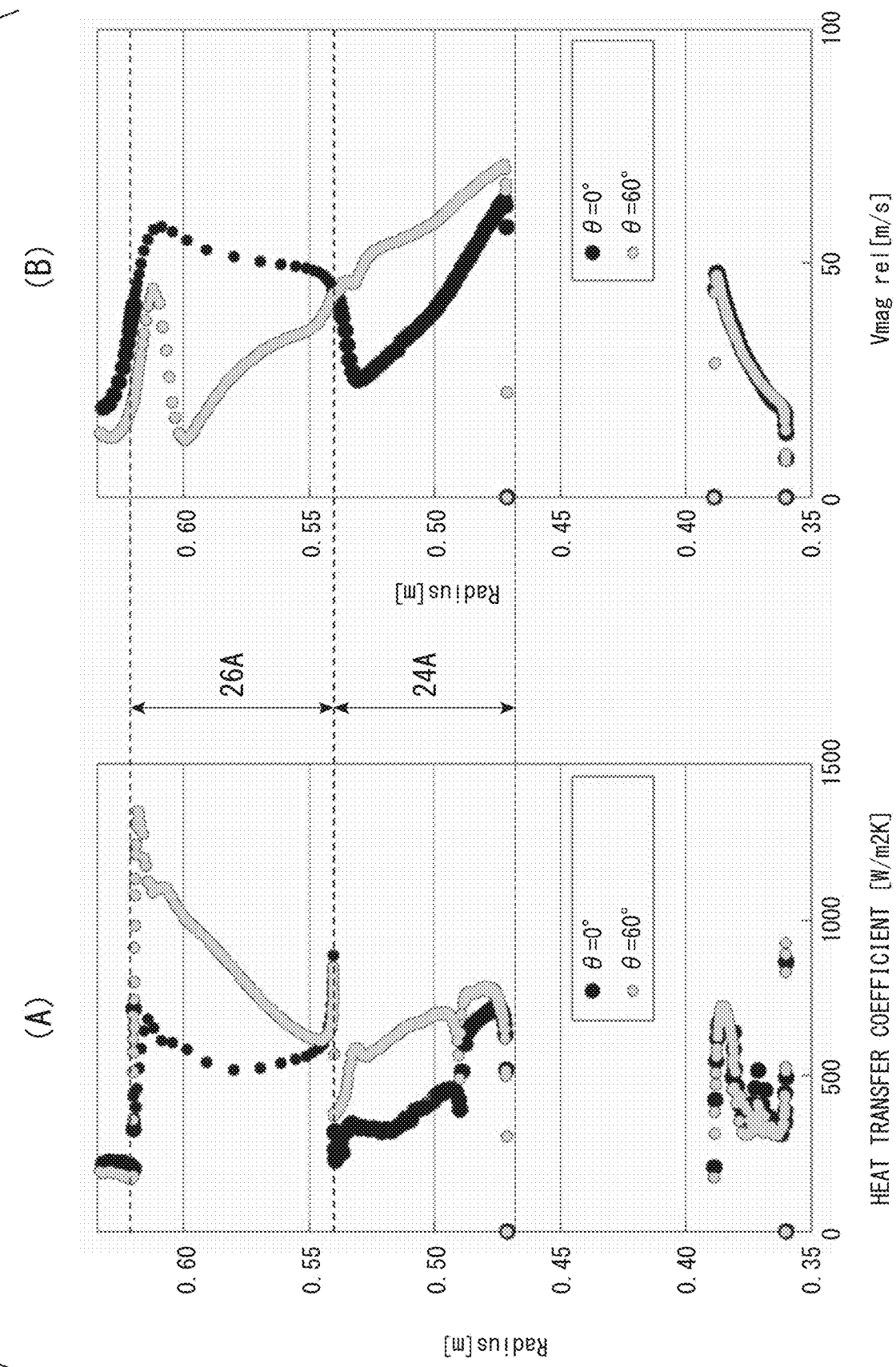
FIG. 11 illustrates simulation results of a heat transfer characteristic and a swirl flow velocity when an inclined angle θ of a first communication passage is set to 60° and when the inclined angle θ of the first communication passage is set to 0°.

FIG. 11 illustrates simulation results of the heat transfer characteristics and the swirl flow velocity when the inclined angle θ of the first communication passage is set to 60° and when the inclined angle θ of the first communication passage is set to 0°. In FIG. 11, the horizontal axis of (A) illustrates the heat transfer coefficient between the air and the cavity wall surface, the horizontal axis of (B) illustrates the swirl flow velocity of air, and the vertical axis illustrates the distance from the axis Ar in common. The case in which the inclined angle θ is 60° corresponds to the first embodiment, and the case in which the inclined angle θ is 0° corresponds to the comparative example.

As illustrated in FIG. 11, it was also checked from the simulation results that the swirl flow velocity of the air in the first inner cavity 24A became fast by inclining the first communication passage 26A. Further, by inclining the first communication passage 26A (θ=60°), the heat transfer coefficient in the first inner cavity 24A is about twice as compared with the case in which the first communication passage 26A is not inclined (θ=0°).

The flow of air in the first outer cavity 23A, the first communication passage 26A and the first inner cavity 24A has been described so far. Hereinafter, the outflow of air flowing in the order of the second inner cavity 24B, the second communication passage 26B and the second outer cavity 23B will be described.

Figure 12:
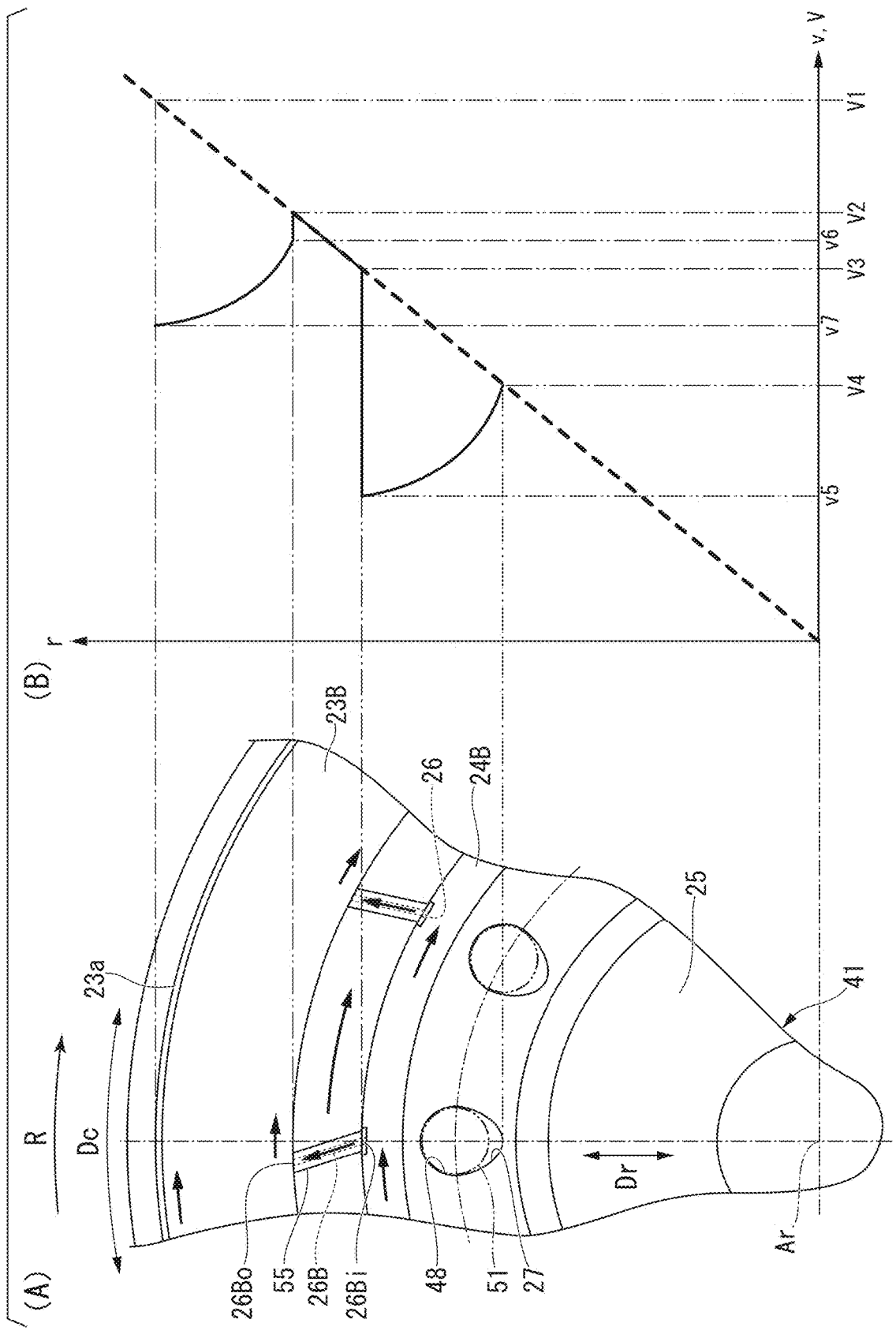
FIG. 12A is a plan view of the rotor disk of the first embodiment.
FIG. 12B is a graph illustrating a change in the circumferential velocity of air in the rotor.

FIG. 12 illustrates a plan view (A) of the rotor disk according to the first embodiment and a circumferential velocity change (B) of the air inside the rotor. In FIG. 12B, the horizontal axis indicates the circumferential velocity v, V of the air or the rotor main body, and the vertical axis indicates the distance r from the axis Ar. Also, in FIG. 12, a thick broken line illustrates the circumferential velocity of the rotor main body 21, and a thin solid line illustrates the swirl flow velocity of air in the rotor main body 21. In FIG. 12, the same constituent parts as the structure illustrated in FIG. 4 are denoted by the same reference numerals.

As described above, since the axial flow passage 27 rotates integrally with the rotor main body 21 around the axis Ar, the circumferential velocity of the air rotating integrally with the inside of the axial flow passage 27 is substantially the same as the circumferential velocity V4 of the rotor main body 21 at the position of the axial flow passage 27.

The air flowing into the second inner cavity 24B from the axial flow passage 27 flows toward the outer side in the radial direction Dr, while flowing in the circumferential direction Dc relatively with respect to the second inner cavity 24B. The swirl flow velocity of the air decreases as it flows in the second inner cavity 24B to the outer side the radial direction Dr by the law of conservation of angular momentum. Further, just before reaching the second inflow surface 26Bi of the plurality of second communication passages 26B, the swirl flow velocity of air becomes v5.

The air that has reached the outer end of the second inner cavity 24B in the radial direction Dr flows into one of the plurality of second communication passages 26B. The second communication passage 26B is separated in the circumferential direction Dc, and the air in the second communication passage 26B rotates integrally with the rotor main body 21. Therefore, the circumferential velocity of the air in the second communication passage 26B is substantially the same as the circumferential velocity V3 of the rotor main body 21 at the position of the second inflow surface 26Bi of the second communication passage 26B.

Here, there is a circumferential velocity difference (=v5−V3) between the circumferential velocity v5 of air when reaching the second inflow surface 26Bi of the second inner cavity 24B and the circumferential velocity V3 of the rotor main body 21 at the position of the second inflow surface 26Bi of the second communication passage 26B. Therefore, because of the relative velocity, as viewed from the second communication passage 26B, the air flows into the second communication passage 26B from the direction opposite to the rotation direction R.

The air having passed through the second communication passage 26B flows into the second outer cavity 23B. The entirety of the second communication passage 26B is inclined so that one end of the second communication passage 26B close to the second outer cavity 23B is positioned backward in the rotation direction R with respect to the other end of the second communication passage 26B close to the second inner cavity 24B. Therefore, the air flowing out from the second communication passage 26B has a circumferential direction Dc component of the rotor main body 21. The direction of the air flowing out from the second communication passage 26B is opposite to the rotation direction of the rotor main body 21. Therefore, the swirl flow velocity v6 of the air just after flowing into the second outer cavity 23B becomes a velocity obtained by subtracting the circumferential direction component of the flow velocity of the gas flowing out from the second communication passage 26B from the circumferential velocity v2 of the rotor main body 21 at the position of the second outflow surface 26Bo of the second communication passage 26B.

Further, the air flowing into the second outer cavity 23B flows in the radial direction Dr, while flowing in the circumferential direction Dc relatively with respect to the second outer cavity 23B. Even in the second outer cavity 23B, the swirl flow velocity of the air decreases as the air flows in the second outer cavity 23B toward the outer side in the radial direction Dr by the law of conservation of angular momentum. The swirl flow velocity of the air becomes v7 just before reaching the opening 23a with the air compression flow passage 19. Further, the air returns to the air compression flow passage 19 via the opening 23a.

Figure 13:
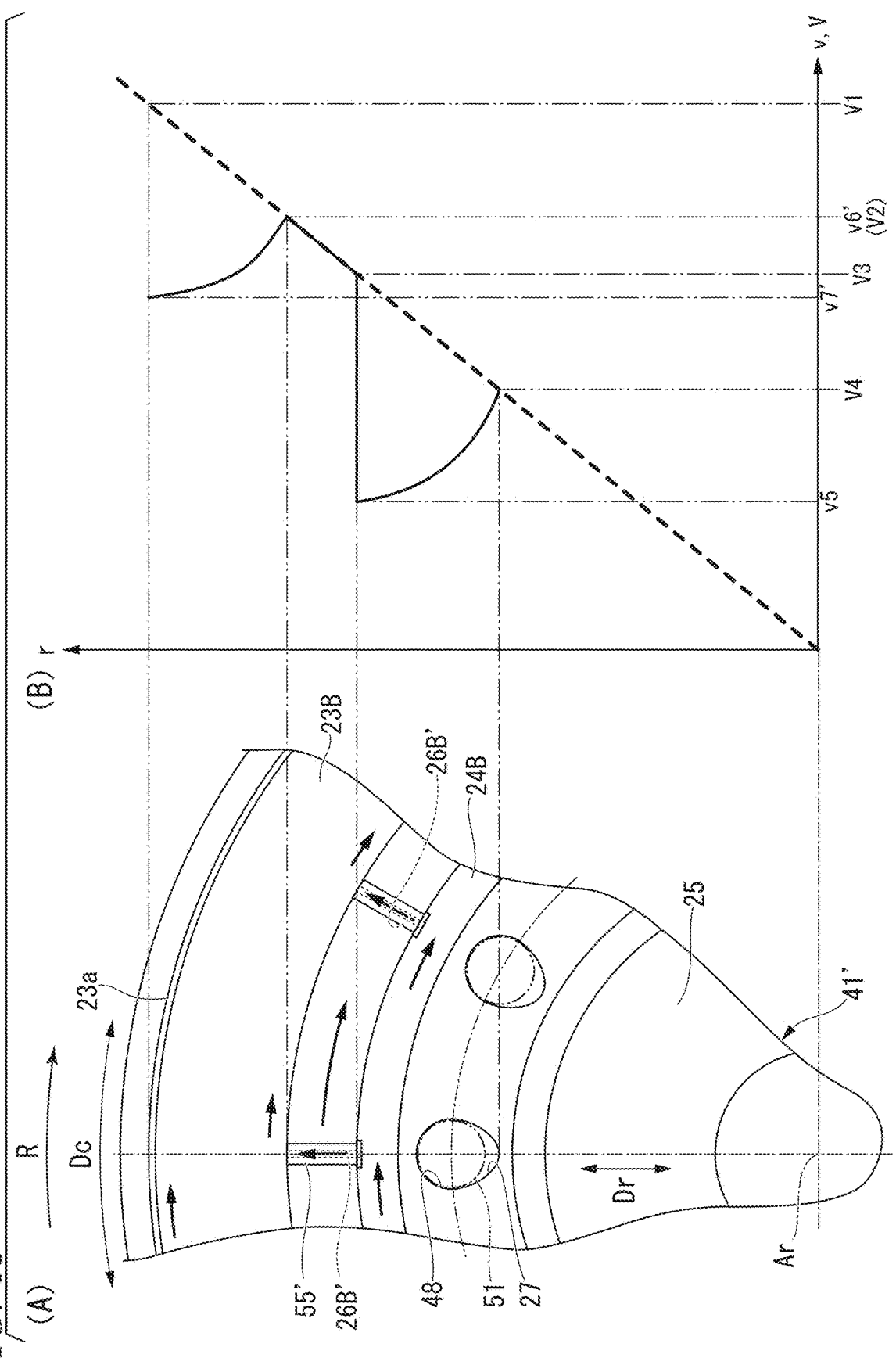
FIG. 13A is a plan view of the rotor disk of the comparative example.
FIG. 13B is a graph illustrating a change in the circumferential velocity of air in the rotor.

FIG. 13 illustrates a plan view (A) of a rotor disk according to a comparative example and a circumferential velocity change (B) of air inside the rotor. In FIG. 13, a thick broken line illustrates the circumferential velocity of the rotor main body 21, and a thin solid line illustrates the swirl flow velocity of air in the rotor main body 21. In FIG. 13, the same constituent parts as the structure illustrated in FIG. 12 are denoted by the same reference numerals.

Next, the outflow of air in the compressor rotor of the comparative example will be described with reference to FIG. 13. The rotor disk 41' according to the comparative example is different from the second communication passage 26B of the first embodiment in that a torque pin 55' extends in the radial direction Dr and a second communication passage 26B' is not inclined with respect to the radial direction Dr. Therefore, due to the difference in shape of the second communication passage, the condition under which the air flows into the second outer cavity 23B changes.

As illustrated in FIG. 13, the outflow direction of the air flowing out from the second communication passage 26B' coincides with the radial direction Dr, and the air flowing out of the second communication passage 26B' does not have the circumferential direction Dc component. That is, a swirl flow velocity v6' of the air just after flowing into the second outer cavity 23B substantially coincides with the circumferential velocity v2 of the rotor main body 21 at the position of the outflow surface of the second communication passage 26B'. Further, as the swirl flow velocity increased as it flows in the second outer cavity 23B toward the outer side in the radial direction Dr, the swirl flow velocity of air becomes v7' just before reaching the opening 23a with the air compression flow passage 19.

Figure 14:
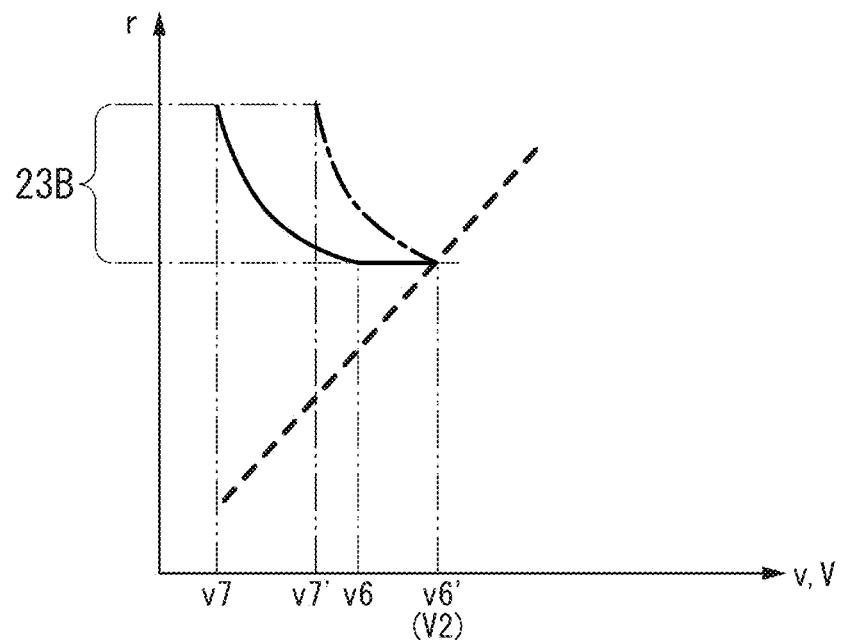
FIG. 14 is a graph obtained by comparing only a portion of a second outer cavity 23B extracted from the graphs of FIGS. 12 and 13.

FIG. 14 is a graph comparing only the second outer cavity 23B extracted from the graphs of FIGS. 12 and 13. In FIG. 14, a horizontal axis indicates the circumferential velocity v, V of the air or the rotor main body, and a vertical axis indicates the distance r from the axis Ar. Further, in FIG. 14, a thick broken line illustrates the circumferential velocity of the rotor main body 21, a thin solid line illustrates the swirl flow velocity of air in the second outer cavity 23B in the first embodiment, and an alternate long and short dashed line illustrates the swirl flow velocity of the air inside second outer cavity 23B in the comparative example.

As illustrated in FIG. 14, the relative velocity difference between the swirl flow velocity of air in the second outer cavity 23B and the circumferential velocity of the rotor main body 21 in the first embodiment is greater than the relative velocity difference between the swirl flow velocity of air in the second outer cavity 23B and the circumferential velocity of the rotor main body 21 in the comparative example. That is, by inclining the second communication passage 26B in a predetermined direction, it is possible to increase the relative velocity difference between the swirl flow velocity of air in the second outer cavity 23B and the circumferential velocity of the rotor main body 21.

Therefore, according to the compressor rotor 20 of the first embodiment, it is possible to increase the relative velocity difference between the circumferential velocity of the rotor main body 21 and the swirl flow velocity in the second outer cavity 23B, and the heat transfer coefficient to the wall surface defining the cavity can be increased.

As described above, in the first embodiment, a circulating flow is generated in the rotor main body 21, using the pressure difference in the axial direction Da in the air compression flow passage 19 as a driving force. Therefore, in the first embodiment, as long as the rotor main body 21 rotates, due to the circulating flow of air flowing through the first outer cavity 23A, the first inner cavity 24A, the second inner cavity 24B, and the second outer cavity 23B, these cavities can be ventilated.

Further, in the first embodiment, it is possible to increase the circumferential velocity difference between the air and the cavity 22 in each cavity 22 through which the air from the air compression flow passage 19 flows. Therefore, it is possible to increase the heat transfer coefficient of the surface of the rotor disk 41 defining the cavity 22. That is, the compressor rotor 20 according to the first embodiment can sufficiently increase the thermal responsiveness of the compressor rotor with respect to the temperature change of the air flowing through the air compression flow passage.

Further, in the first embodiment, the axial flow passage 27 for causing the inner cavity 24 to communicate is formed at a position inner side the radial direction Dr than the central position in the radial direction Dr of the inner cavity 24. Therefore, the air circulates to the inner side in the radial direction Dr of the inner cavity 24, and the heat transfer efficiency can be further improved.

Further, in the first embodiment, the pressure loss of the air flowing inside the communication passage 26 can be reduced. As illustrated in FIG. 5, the communication passage 26 according to the first embodiment has a circular cross section.

Here, the configuration in which the central axis has the straight shape means that the straight line connecting the center of the opening surface of one end portion of the communication passage 26 and the center of the opening surface of the other end portion of the communication passage 26 substantially coincides with the central axis of the communication passage 26. One end portion of the communication passage corresponds to the first inflow surface 26Ai in the first communication passage 26A or the second outflow surface 26Bo in the second communication passage 26B, and the other end portion of the communication passage corresponds to the first outflow surface 26Ao in the first communication passage 26A or the second inflow surface 26Bi in the second communication passage 26B.

Figure 15A:
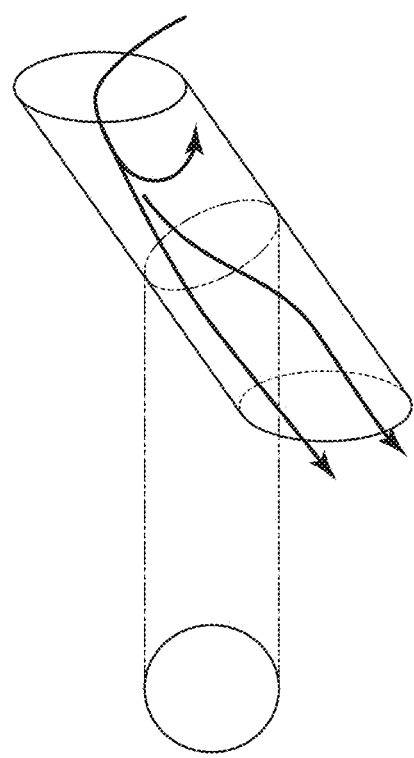
FIG. 15A is a diagram (part 1) schematically illustrating a difference in the shape of the communication passage and the flow of air.
Figure 15B:
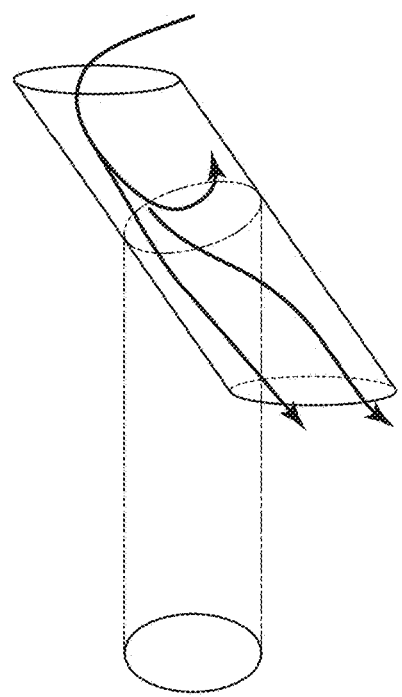
FIG. 15B is a diagram (part 2) schematically illustrating a difference in the shape of the communication passage and flow of air.
Figure 15C:
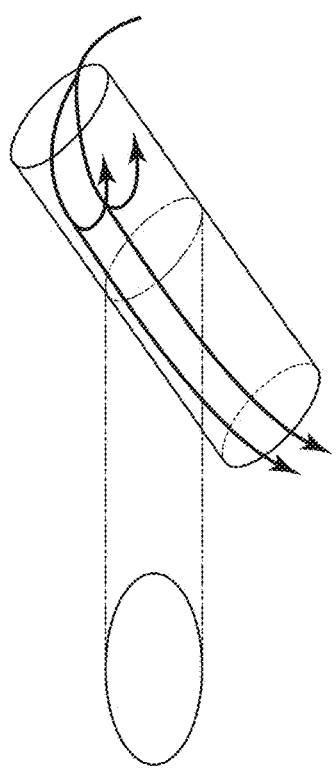
FIG. 15C is a diagram (part 3) schematically illustrating a difference in the shape of the communication passage and the flow of air.
Figure 15D:
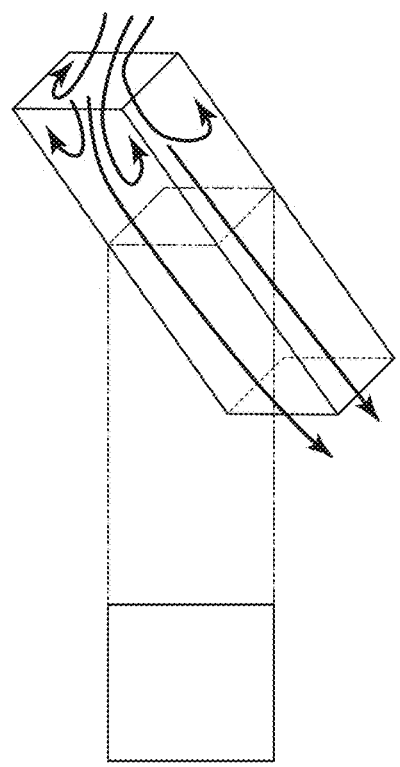
FIG. 15D is a diagram (part 4) schematically illustrating a difference in the shape of the communication passage and the flow of air.

FIGS. 15A to 15D are diagrams (parts 1 to 4) schematically illustrating a difference in the shape of the communication passage and the flow of air. In FIG. 15A, a case in which the cross-sectional shape perpendicular to the extending direction of the communication passage is circular is illustrated as an example. In FIG. 15B, a case in which the cross-sectional shape perpendicular to the extending direction of the communication passage is an ellipse (an ellipse in which a major axis coincides with the circumferential direction) is illustrated as an example. In FIG. 15C, a case in which the cross-sectional shape perpendicular to the extending direction of the communication passage is an ellipse (an ellipse in which a major axis is orthogonal to the circumferential direction) is illustrated as an example. In FIG. 15D, a case in which the cross-sectional shape perpendicular to the extending direction of the communication passage is a quadrangle is illustrated as an example.

The case in which air flows into the first communication passage 26A will be described as an example. As described above, as viewed from the first communication passage 26A, the air flowing into the first communication passage 26A flows into the first communication passage 26A from the direction opposite to the rotation direction R.

As illustrated in FIG. 15C, in the case in which the cross cross-sectional shape perpendicular to the extending direction of the communication passage is an ellipse in which a major axis is orthogonal to the circumferential direction, the direction in which air flows is a minor axis direction of the ellipse. Therefore, since the air is hard to flow in and detachment easily occurs at the inlet portion, the inlet loss increases. Further, as illustrated in FIG. 15D, when the cross-sectional shape perpendicular to the extending direction of the communication passage is a quadrangular shape, since a corner vortex is likely to occur at the corner portion, the inlet loss increases.

On the other hand, when the cross-sectional shape perpendicular to the extending direction of the communication passage is the shape illustrated in FIGS. 15A and 15B, since the detachment at the inlet portion is relatively small, the inlet loss is small. Particularly, as illustrated in FIG. 15A, when the cross-sectional shape perpendicular to the extending direction of the communication passage is circular, symmetry is high and the pressure loss is the smallest.

Further, in the example of the communication passage illustrated in FIGS. 15A to 15D, the central axis is straight. That is, the communication passage has a shape that is easily processed. Therefore, it is possible to suppress the manufacturing cost of the compressor rotor having the communication passage.

In the first embodiment, by setting the inclined angle θ of the communication passage 26 with respect to the radial direction Dr to be within a predetermined range, it is possible to obtain a balance between the reduction in the pressure loss and the improvement in the thermal responsiveness of the compressor rotor with respect to the temperature change of the air flowing through the air compression flow passage. Here, the inclined angle θ of the communication passage 26 with respect to the radial direction Dr is preferably 10° or more and 80° or less.

The communication passage 26 is narrower than the cavity 22. Therefore, a pressure loss easily occurs in the communication passage 26 due to friction loss between the wall surface and the circulating air. That is, by setting the inclined angle θ to 45° or less, it is possible to avoid the length of the communication passage 26 from becoming too long, and it is possible to avoid an increase in pressure loss.

Further, as described above, when the inclined angle with respect to the radial direction of the rotor main body increases, it is possible to increase the relative velocity difference between the swirl flow velocity of the air flowing in the cavity 22 and the circumferential velocity of the cavity 22 itself. The reason is that, in the first inner cavity 24A, the degree of coincidence between the direction of the air flowing out from the first communication passage 26A and the rotation direction of the rotor main body 21 increases, and in the second outer cavity 23B, the direction of the air flowing out from the second communication passage 26B and the rotation direction of the rotor main body 21 further face each other. That is, by setting the inclined angle θ to 10° or more, the heat transfer coefficient to the wall surface defining the cavity can be increased.

Figure 16:
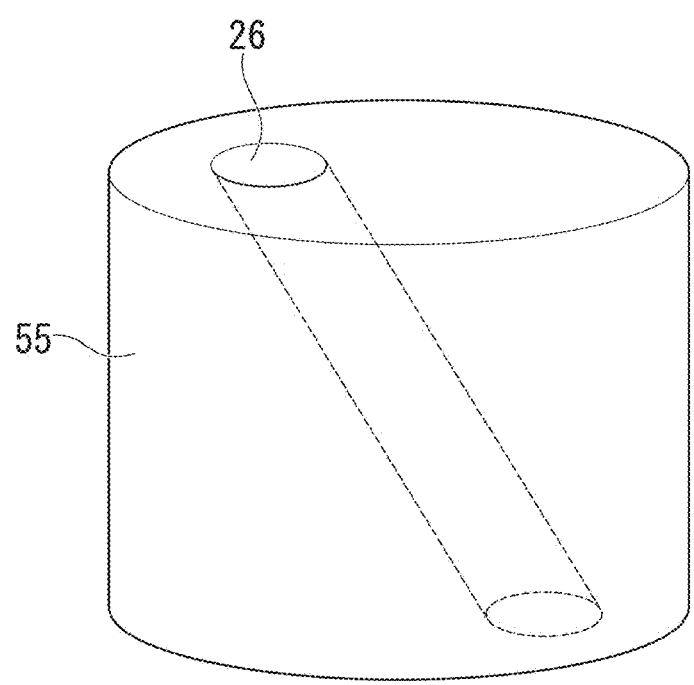
FIG. 16 is a perspective view of a modified example of the torque pin according to the first embodiment of the present invention.

FIG. 16 is a perspective view of a modified example of the torque pin according to the first embodiment of the present invention. The same constituent parts as the structure illustrated in FIG. 5 are denoted by the same reference numerals A modified example of the torque pin will be described with reference to FIG. 16. The modified example may be configured so that the extending direction of the torque pin 55 and the extending direction of the communication passage 26 provided inside the torque pin 55 may not coincident with each other as illustrated in FIG. 16. If the communication passage 26 is inclined with respect to the radial direction Dr, the heat transfer coefficient to the wall surface defining the cavity can be increased.

Second Embodiment

Figure 17:
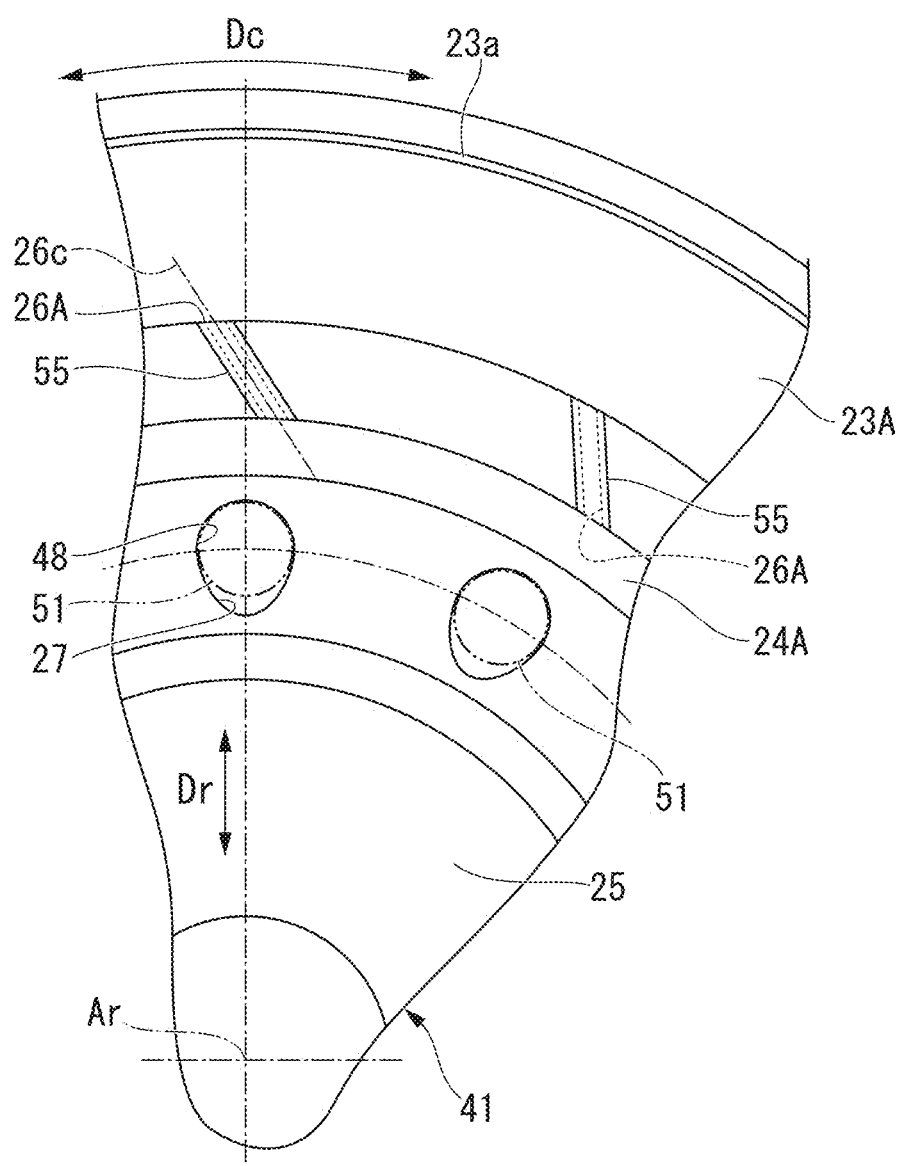
FIG. 17 is a plan view of a main part of the rotor disk according to the second embodiment of the present invention as viewed from the axial direction.

FIG. 17 is a plan view of a main part of a rotor disk according to a second embodiment of the present invention as viewed from the axial direction. In FIG. 17, the same constituent parts as the structure illustrated in FIG. 6 are denoted by the same reference numerals.

With reference to FIG. 17, a compressor rotor according to a second embodiment will be described. The compressor rotor of the second embodiment differs from the compressor rotor according to the first embodiment in that the spindle bolt 51 of the rotor disk 41 is positioned different from at a position on an extension line of the central axis 26c of the first communication passage 26A in the extending direction. Therefore, in the following description, the description of the constituent elements common to the compressor rotor according to the first embodiment will be omitted.

The spindle bolt 51 is positioned different from the position on the extension line of the central axis 26c of the first communication passage 26A in the extending direction. Therefore, it is possible to prevent the air flowing out from the first communication passage 26A from colliding with the spindle bolt 51 and decelerating. That is, it is possible to prevent the swirl flow velocity of the air flowing in the first inner cavity 24A from decreasing, and it is possible to further increase the heat transfer coefficient to the wall surface defining the cavity.

Further, in a state in which the rotor disk 41 is viewed from the axial direction, the center of the spindle bolt 51 in the axial direction Da and the central portion of the torque pin 55 in the radial direction Dr are present at positions overlapping when viewed in the radial direction Dr. Since the first communication passage 26A formed in the torque pin 55 is inclined in a predetermined direction, by providing the spindle bolt 51 and the torque pin 55 in the above-described arrangement, it is possible to conveniently provide the arrangement in which the spindle bolt 51 is positioned different from the position on the extension line of the central axis 26c of the first communication passage 26A in the extending direction.

In the second communication passage 26B, since air flows from the second inner cavity 24B toward the second outer cavity 23B, the arrangement of the spindle bolt 51 with respect to the second communication passage 26B is not particularly limited.

Third Embodiment

Figure 18:
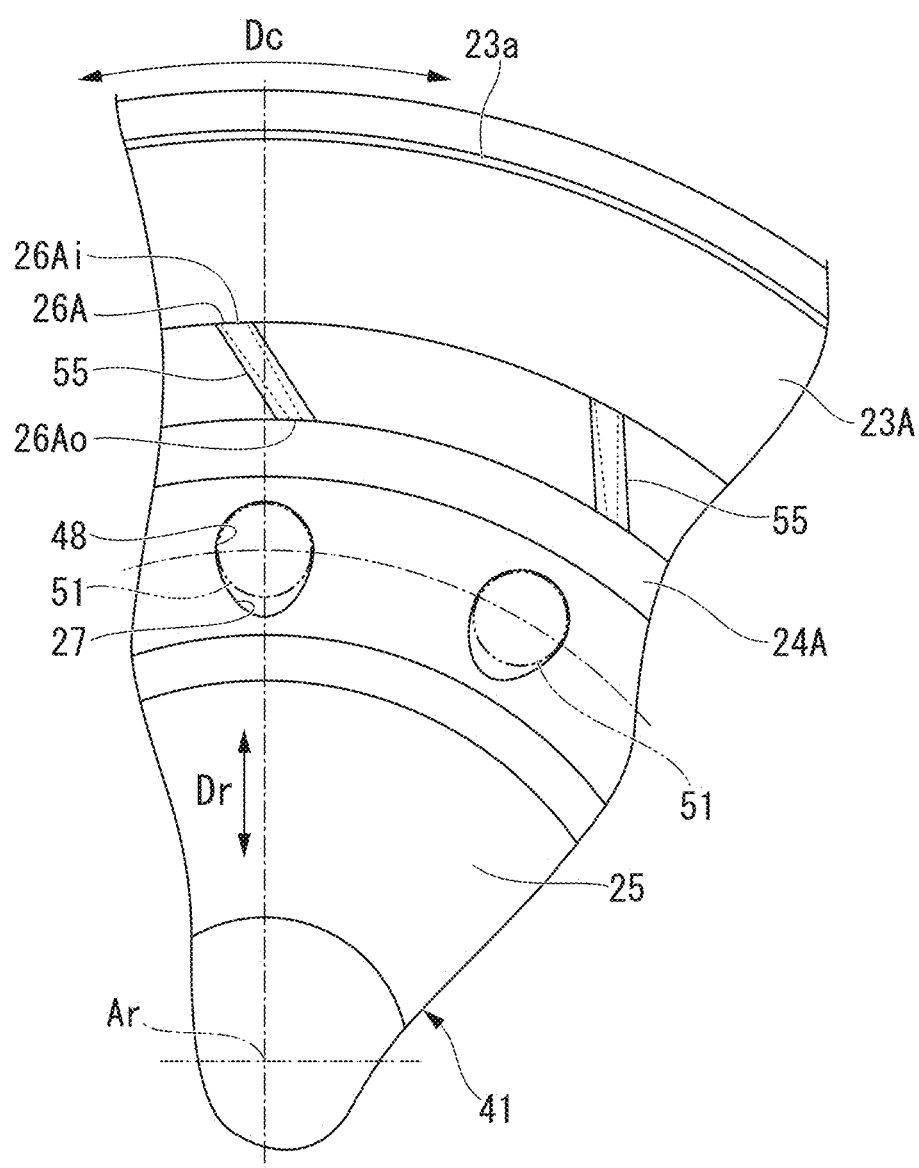
FIG. 18 is a plan view of a main part of a rotor disk according to a third embodiment of the present invention as viewed from the axial direction.

FIG. 18 is a plan view of a main part of a rotor disk according to a third embodiment of the present invention as viewed from the axial direction. In FIG. 18, the same constituent parts as the structure illustrated in FIG. 6 are denoted by the same reference numerals.

Referring to FIG. 18, the compressor rotor of the third embodiment differs from the compressor rotor of the first embodiment in that a diameter of the inflow surface of the communication passage 26 is larger than a diameter of the outflow surface of the communication passage 26. In the following description, descriptions of the constituent elements common to those of the compressor rotor of the first embodiment will not be provided.

Figure 19:
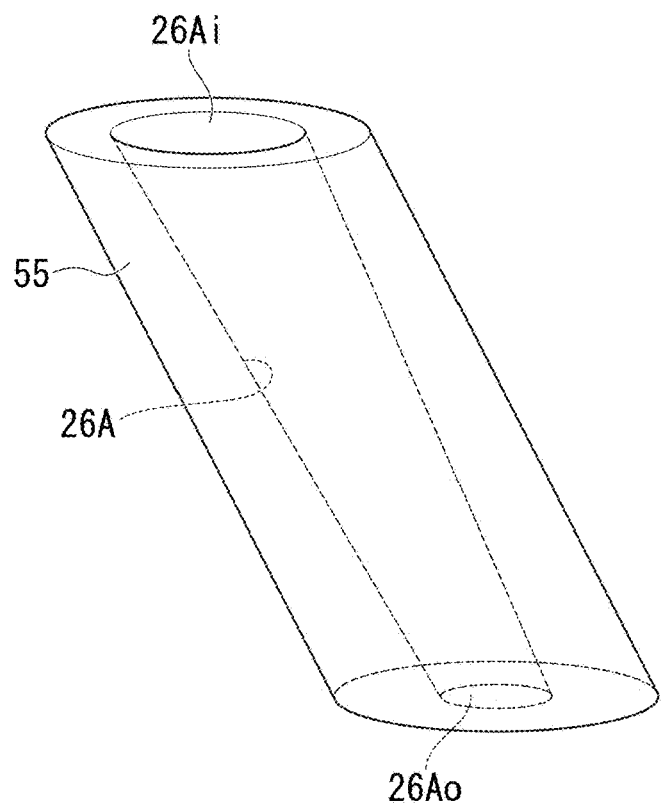
FIG. 19 is a perspective view of a first communication passage according to the third embodiment.

FIG. 19 is a perspective view of a first communication passage according to a third embodiment. With reference to FIG. 19, the first communication passage 26A according to the third embodiment will be described. In FIG. 19, the same constituent parts as the structure illustrated in FIG. 18 are denoted by the same reference numerals.

In the first communication passage 26A, the diameter of the first inflow surface 26Ai which is the contact point with the first outer cavity 23A of the first communication passage 26A is greater than the diameter of the first outflow surface 26Ao of which is the contact point with the first inner cavity 24A of the first communication passage 26A. Therefore, the diameter of the cross-section narrows from the inflow side to the outflow side of air, of the surface of the first communication passage 26A cut along a cross-section perpendicular to the extending direction of the first communication passage 26A.

Since the cross-sectional area of the first outflow surface 26Ao is smaller than the cross-sectional area of the first inflow surface 26Ai, the flow velocity of the air flowing out from the first outflow surface 26Ao further increases than after passage through the inflow surface Ai. Therefore, the relative velocity difference between the swirl flow velocity of the air flowing in the first inner cavity 24A and the circumferential velocity of the first inner cavity 24A itself increases, and it is possible to further increase the heat transfer coefficient to the wall surface defining the cavity.

Figure 20:
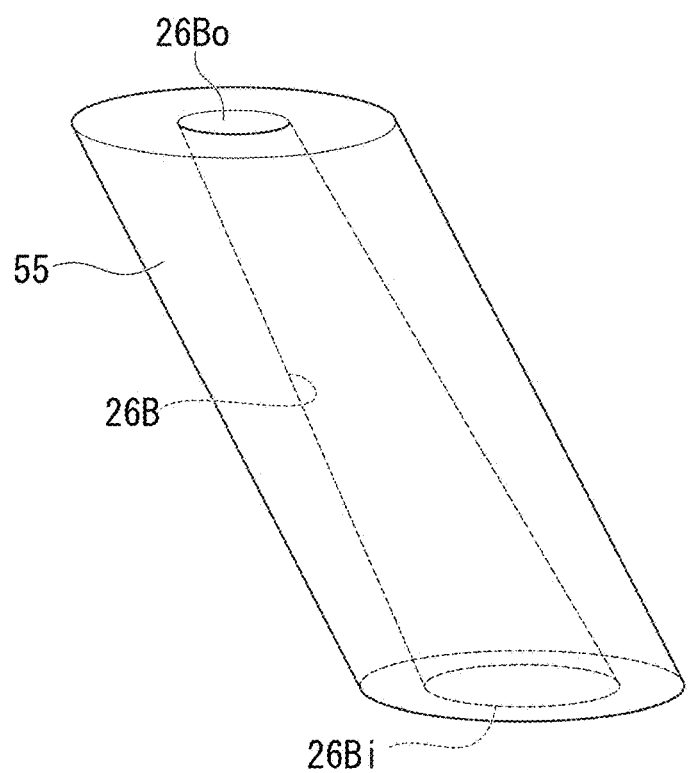
FIG. 20 is a perspective view of a second communication passage according to the third embodiment.

FIG. 20 is a perspective view of a second communication passage according to the third embodiment. In FIG. 20, the same constituent parts as the structure illustrated in FIG. 19 are denoted by the same reference numerals.

The second communication passage 26B of the third embodiment will be described with reference to FIG. 20. In the second communication passage 26B, air flows from the second inner cavity 24B toward the second outer cavity 23B. Therefore, in the second communication passage 26B, the diameter of the second inflow surface 26Bi which is the contact point of the second communication passage 26B with the second inner cavity 24B is greater than the diameter of the second outflow surface 26Bo which is the contact point of the second communication passage 26B with the second outer cavity 23B.

The direction of the circumferential direction component of the air flowing out from the second communication passage 26B is opposite to the rotation direction R of the rotor main body 21. Therefore, when the velocity of the air flowing out from the second communication passage 26B increases, the swirl flow velocity in the second outer cavity 23B becomes slow. Therefore, the relative velocity difference between the swirl flow velocity of the air flowing in the second outer cavity 23B and the circumferential velocity of the second outer cavity 23B itself increases, and it is possible to further increase the heat transfer coefficient to the wall surface defining the cavity.

Although the preferred embodiments of the present invention have been described in detail above, the present invention is not limited to such specific embodiments, and various modifications and changes can be made within the scope of the gist of the present invention described in the claims.

INDUSTRIAL APPLICABILITY

The present invention is applicable to a compressor rotor, a compressor, and a gas turbine.

REFERENCE SIGNS LIST

1 Compressor
2 Combustor
3 Turbine
4 Turbine rotor
5 Turbine casing
8 Gas turbine rotor
9 Gas turbine casing
10 Compressor casing
11i Inlet
11 Stationary vane row
12 Stationary vane
13 Vane body
14 Outer shroud
15 Inner shroud
16 Seal ring
19 Air compression flow passage
20 Compressor rotor
22 Cavity
23 Outer cavity
23A First outer cavity
23B Second outer cavity
23a Opening
24 Inner cavity
24A First inner cavity
24B Second inner cavity
25 Axial center side cavity
26 Communication passage
26A First communication passage
26B Second communication passage
26c Central axis
26Ai First inflow surface
26Ao First outflow surface
26Bi Second inflow surface
26Bo Second outflow surface
27 Axial flow passage
41 Rotor disk
41A Upstream disk
41B Downstream disk
43d Downstream surface first concave portion
45d Downstream surface second concave portion
47d Downstream surface third concave portion
42d Downstream surface first arm portion
44d Downstream surface second arm portion
46d Downstream surface third arm portion
43u Upstream surface first concave portion
45u Upstream surface second concave portion
47u Upstream surface third concave portion
42u Upstream surface first arm portion
44u Upstream surface second arm portion
46u Upstream surface third arm portion
48 Through-hole
44dp Downstream surface pin groove
44up Upstream surface pin groove
51 Spindle bolt
55 Torque pin
81 Rotor blade row
82 Rotor blade
83 blade body
84 Platform
85 Blade root

The invention claimed is:

1. A compressor rotor, comprising:
a rotor main body extending in an axial direction;
a plurality of blades formed on an outer circumference of the rotor main body at intervals in a circumferential direction and configured to feed a fluid with pressure by rotating about an axis together with the rotor main body;
a first outer cavity formed in the rotor main body and into which air on a high-pressure side of the blades is to be introduced;
a first inner cavity formed in the rotor main body on an inner side in a radial direction of the first outer cavity;
a first communication passage which connects the first outer cavity and the first inner cavity to each other in the radial direction of the first outer cavity;
a second outer cavity formed in the rotor main body on a low-pressure side in the axial direction from the first outer cavity;
a second inner cavity formed in the rotor main body on an inner side in a radial direction of the second outer cavity;
a second communication passage which connects the second outer cavity and the second inner cavity to each other in the radial direction of the second outer cavity; and
an axial flow passage which connects the first inner cavity and the second inner cavity to each other in the axial direction, wherein, along an entire length of the first communication passage from the first outer cavity to the first inner cavity, the first communication passage is inclined toward a forward side of a rotation direction of the rotor main body.

2. The compressor rotor according to claim 1, wherein, along an entire length of the second communication passage from the second inner cavity to the second outer cavity, the second communication passage is inclined toward a backward side of the rotation direction of the rotor main body.

3. The compressor rotor according to claim 1, further comprising:
   a spindle bolt passing through the axial flow passage in the axial direction,
   wherein the spindle bolt is positioned differently from a position on an extension line of a central axis of the first communication passage.

4. The compressor rotor according to claim 1, wherein a cross section perpendicular to an extending direction of the first communication passage has a circular shape.

5. The compressor rotor according to claim 1, wherein a cross section perpendicular to an extending direction of the second communication passage has a circular shape.

6. The compressor rotor according to claim 1, wherein a central axis of the first communication passage in an extending direction is a straight line.

7. The compressor rotor according to claim 1, wherein a central axis of the second communication passage in an extending direction is a straight line.

8. The compressor rotor according to claim 1, wherein a diameter of a first inflow surface which is a contact point between the first communication passage and the first outer cavity is greater than a diameter of a first outflow surface which is a contact point between the first communication passage and the first inner cavity.

9. The compressor rotor according to claim 1, wherein a diameter of a second inflow surface which is a contact point between the second communication passage and the second inner cavity is greater than a diameter of a second outflow surface which is a contact point between the second communication passage and the second outer cavity.

10. The compressor rotor according to claim 1, wherein a central axis of the first communication passage is inclined at an inclined angle of 10° or more and 80° or less with respect to a radial direction of the rotor main body.

11. The compressor rotor according to claim 1, wherein a central axis of the second communication passage is inclined at an inclined angle of 10° or more and 80° or less with respect to a radial direction of the rotor main body.

12. A compressor, comprising:
    the compressor rotor according to claim 1; and
    a compressor casing covering the compressor rotor.

13. A gas turbine, comprising:
    the compressor according to claim 12;
    a combustor configured to combust fuel in air compressed by the compressor to generate a combustion gas; and
    a turbine configured to be driven by the combustion gas.

* * * * *